(12) United States Patent
Nozawa

(10) Patent No.: US 10,022,960 B2
(45) Date of Patent: *Jul. 17, 2018

(54) LIQUID EJECTING APPARATUS AND DRIVE CIRCUIT

(71) Applicant: SEIKO EPSON CORPORATION, Tokyo (JP)

(72) Inventor: Dai Nozawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/446,099

(22) Filed: Mar. 1, 2017

(65) Prior Publication Data

US 2017/0266960 A1    Sep. 21, 2017

(30) Foreign Application Priority Data

Mar. 18, 2016 (JP) ................................. 2016-055306

(51) Int. Cl.
*B41J 2/045* (2006.01)
*H02N 2/06* (2006.01)

(52) U.S. Cl.
CPC ....... *B41J 2/04541* (2013.01); *B41J 2/04501* (2013.01); *B41J 2/04581* (2013.01); *H02N 2/06* (2013.01)

(58) Field of Classification Search
CPC .......... B41J 2/04541; B41J 2/04501; B41J 2/04581; H02N 2/06
See application file for complete search history.

(56) References Cited

U.S. PATENT DOCUMENTS

| 7,852,128 | B2 | 12/2010 | Kitazawa et al. | |
| 9,180,662 | B2 | 11/2015 | Yamada | |
| 9,346,264 | B2 | 5/2016 | Otsuka et al. | |
| 9,849,670 | B2 | 12/2017 | Yamada | |
| 2009/0051745 | A1* | 2/2009 | Watanabe | B41J 2/17546 347/86 |
| 2017/0266958 | A1* | 9/2017 | Yamada | B41J 2/04588 |

FOREIGN PATENT DOCUMENTS

| JP | 2009-190287 A | 8/2009 |
| JP | 2010-114711 A | 5/2010 |

* cited by examiner

*Primary Examiner* — Yaovi M Ameh

(57) ABSTRACT

A liquid ejecting apparatus includes an ejecting unit that includes a piezoelectric element and ejects liquid by driving the piezoelectric element; a first drive circuit that generates a first drive signal; a second drive circuit that generates a second drive signal; and a circuit substrate having one surface on which the first drive circuit is mounted and the other surface on which the second drive circuit is mounted. The first drive circuit includes a first pair of transistors and a second pair of transistors. The second drive circuit includes a third pair of transistors and a fourth pair of transistors. A distance between the first pair of transistors and the third pair of transistors is shorter than a distance between the first pair of transistors and the fourth pair of transistors.

5 Claims, 20 Drawing Sheets

⟨DECODED CONTENT OF DECODER⟩

| PRINT DATA SI | T1 | | T2 | |
|---|---|---|---|---|
| | Sa | Sb | Sa | Sb |
| LARGE DOT ---▶ (1, 1) | H | L | H | L |
| MEDIUM DOT ---▶ (0, 1) | H | L | L | H |
| SMALL DOT ---▶ (1, 0) | L | L | L | H |
| NO RECORD ---▶ (0, 0) | L | H | L | L |

MSB  LSB

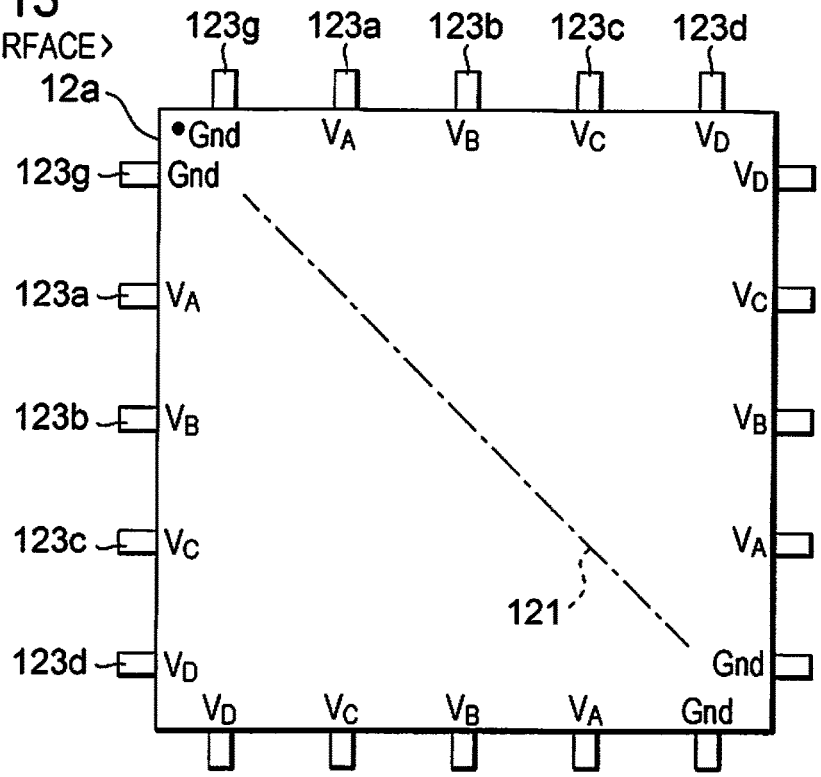
FIG. 13 <FRONT SURFACE>
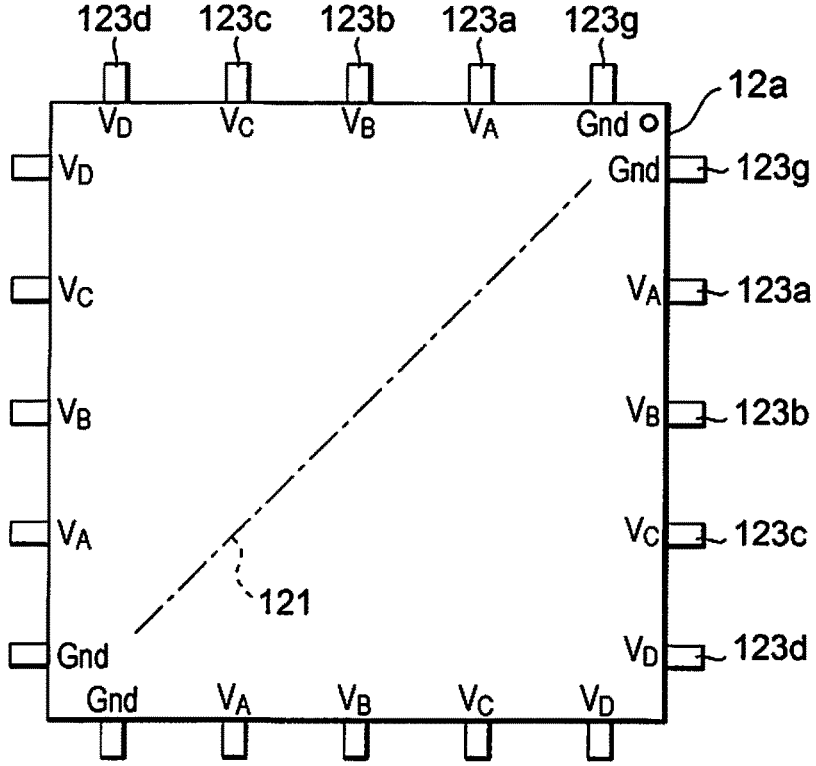
FIG. 14 <REAR SURFACE>

⟨ROTATION BY 90 DEGREES⟩

<FRONT SURFACE>

<REAR SURFACE>

<FRONT SURFACE>

<REAR SURFACE>

⟨ROTATION BY 90 DEGREES⟩

LIQUID EJECTING APPARATUS AND DRIVE CIRCUIT

The entire disclosure of Japanese Patent Application No. 2016-055306, filed Mar. 18, 2016 is expressly incorporated by reference herein.

BACKGROUND

1. Technical Field

The present invention relates to a liquid ejecting apparatus and a drive circuit.

2. Related Art

An apparatus which uses a piezoelectric element (for example, a piezo element) is known as an ink jet printer which prints an image or a document by ejecting ink. Piezoelectric elements are provided in correspondence with each of multiple nozzles in a head unit, each of the piezoelectric elements is driven in accordance with a drive signal, and thereby, a predetermined amount of ink (liquid) is ejected from the nozzle at a predetermined timing to form dots. The piezoelectric element is a capacitive element such as a capacitor from a viewpoint of electricity, and needs to receive a sufficient current in order to operate the piezoelectric elements of each nozzle.

For this reason, a printing apparatus has a configuration in which an original drive signal which is an origin of a drive signal is amplified by an amplification circuit to be set as a drive signal and the piezoelectric elements are driven based on the drive signal. It is recommended that an amplification circuit uses a method (linear amplification, refer to JP-A-2009-190287) of current-amplifying the original drive signal in an AB class or the like. However, since power consumption increases and energy efficiency decreases in the linear amplification, a D-class amplification is also proposed in recent years (refer to JP-A-2010-114711). In short, in a D-class amplification, a pulse width modulation or a pulse density modulation of the original drive signal is performed, a high side transistor and a low side transistor that are inserted in series between power supply voltages are switched in accordance with the modulated signal, an output signal which is generated by the switching is filtered by a low pass filter, and thus, the original drive signal is amplified.

However, energy efficiency of a D-class amplification method is higher than that of a linear amplification method, power which is consumed by a low pass filter cannot be ignored, and thus, there is room for improvement in terms of reducing power consumption.

SUMMARY

An advantage of some aspects of the invention is to provide a liquid ejecting apparatus and a drive circuit which are miniaturized by satisfying requirements of a printing apparatus and reduce power consumption.

A liquid ejecting apparatus according to an aspect of the invention includes an ejecting unit that includes a piezoelectric element and ejects liquid by driving the piezoelectric element; a first drive circuit that generates a first drive signal from a first original drive signal which is an origin of the first drive signal driving the piezoelectric element in accordance with a first voltage and a second voltage higher than the first voltage; a second drive circuit that generates a second drive signal from a second original drive signal which is an origin of the second drive signal driving the piezoelectric element in accordance with the first voltage and the second voltage; and a circuit substrate having one surface on which the first drive circuit is mounted and the other surface on which the second drive circuit is mounted. The first drive circuit includes a first control circuit; a first pair of transistors to which the first voltage is applied; and a second pair of transistors which is electrically coupled in series to the first pair of transistors and to which the second voltage is applied. The first control circuit outputs a first control signal for controlling an operation of the first pair of transistors and a second control signal for controlling an operation of the second pair of transistors respectively, in accordance with the first original drive signal. The second drive circuit includes a second control circuit; a third pair of transistors to which the first voltage is applied; and a fourth pair of transistors which is electrically coupled in series to the first pair of transistors and to which the second voltage is applied. The second control circuit outputs a third control signal for controlling an operation of the first pair of transistors and a fourth control signal for controlling an operation of the fourth pair of transistors, in accordance with the second original drive signal. The first pair of transistors, the second pair of transistors, the third pair of transistors, and the fourth pair of transistors are disposed on the circuit substrate such that a distance between the first pair of transistors and the third pair of transistors is shorter than a distance between the first pair of transistors and the fourth pair of transistors, and a distance between the second pair of transistors and the fourth pair of transistors is shorter than a distance between the second pair of transistors and the third pair of transistors.

According to the liquid ejecting apparatus of the aspect, power consumption is reduced, and in addition, as the first drive circuit is efficiently disposed on one surface of the circuit substrate and the second drive circuit is efficiently disposed on the other surface of the circuit substrate, an area of the circuit substrate is reduced. The aforementioned distance between the pairs of transistors indicates, for example, a distance between two points of a start point that is a coupling point between transistors which configure one pair of transistors and an end point that is a coupling point (coupling point between drains) between transistors which configure the other pair of transistors.

In the liquid ejecting apparatus according to the aspect, the first control circuit may be integrated into the first integrated circuit, and the second control circuit may be integrated into the second integrated circuit.

In addition, in the configuration, an electrical distance between the first integrated circuit and the first pair of transistors may be equal to an electrical distance between the second integrated circuit and the third pair of transistors, and an electrical distance between the first integrated circuit and the second pair of transistors may be equal to an electrical distance between the second integrated circuit and the fourth pair of transistors.

The aforementioned electrical distance between the integrated circuit and the pair of transistors indicates, for example, a wiring distance between two points of a start point that is a terminal of the integrated circuit and an end point that is a coupling point (coupling point between drains) between transistors which configure the pair of transistors.

In the liquid ejecting apparatus according to the aspect, the ejecting unit, the circuit substrate, the first pair of transistors, the second pair of transistors, the third pair of transistors, and the fourth pair of transistors may be mounted on a movable carriage.

The liquid ejecting apparatus may eject liquid, and includes a three-dimensional shaping apparatus (so-called 3D printer), a textile printing apparatus, or the like, in addition to a printing apparatus which will be described below.

In addition, the invention is not limited to a liquid ejecting apparatus, can be realized in various aspects, and can also be conceptualized by a drive circuit driving a load, such as a piezoelectric element.

BRIEF DESCRIPTION OF THE DRAWINGS

The invention will be described with reference to the accompanying drawings, wherein like numbers reference like elements.

FIG. 13 is a plan view illustrating a front surface of an integrated circuit which configures the drive circuit.

FIG. 14 is a plan view illustrating a rear surface of the integrated circuit.

DESCRIPTION OF EXEMPLARY EMBODIMENTS

Hereinafter, embodiments of the invention will be described with reference to the drawings by using a printing apparatus as an example.

Figure 1:
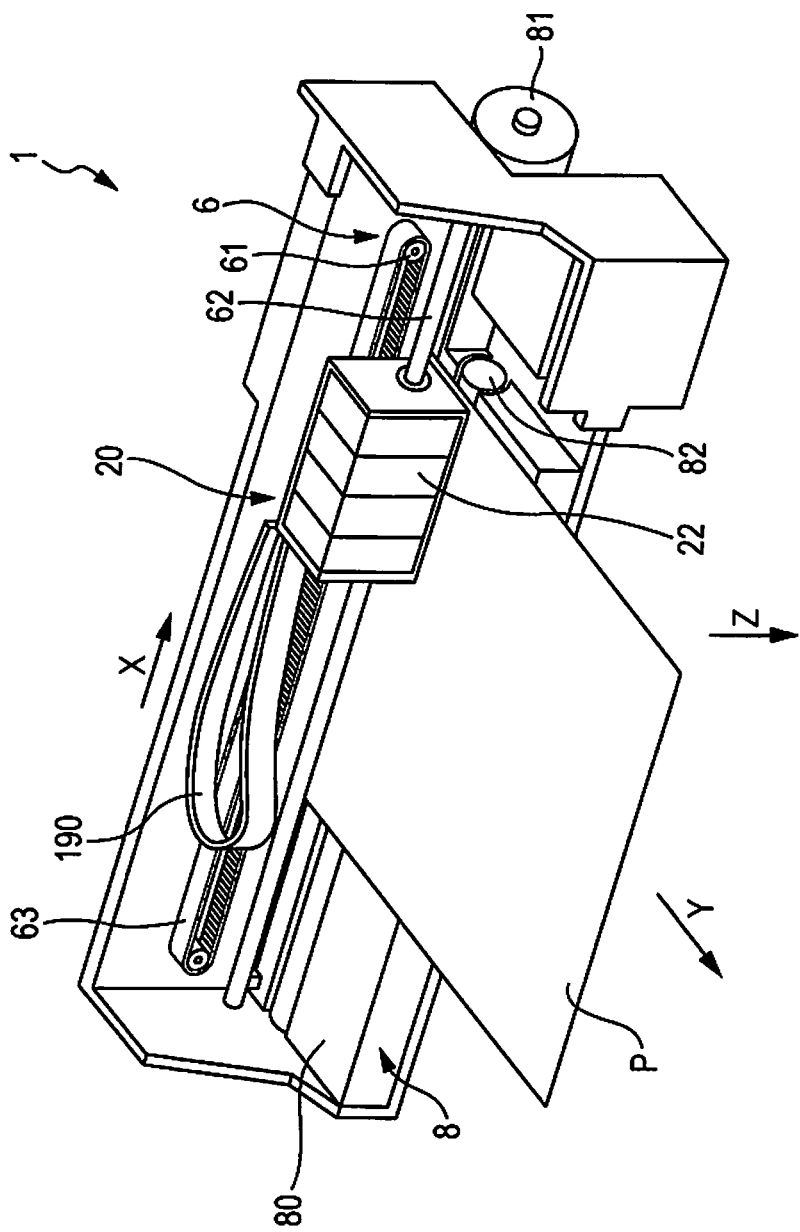
FIG. 1 is a view illustrating a schematic configuration of a printing apparatus to which a drive circuit according to an embodiment is applied.

FIG. 1 is a perspective view illustrating a schematic configuration of a printing apparatus according to an embodiment.

The printing apparatus illustrated in this figure is a type of a liquid ejecting apparatus which ejects ink that is an example of liquid to form an ink dot group on a medium P such as paper, thereby, printing an image (including characters, graphics, or the like).

As illustrated in FIG. 1, the printing apparatus 1 includes a moving mechanism 6 which moves (moves back and forth) a carriage 20 in a main scanning direction (X direction).

The moving mechanism 6 includes a carriage motor 61 which moves the carriage 20, a carriage guide axis 62 both of which are fixed, and a timing belt 63 which extends substantially parallel to the carriage guide axis 62 and is driven by the carriage motor 61.

The carriage 20 is supported by the carriage guide axis 62 so as to move freely back and forth, and is fixed to a part of the timing belt 63. For this reason, if the timing belt 63 travels forward and backward by the carriage motor 61, the carriage 20 is guided by the carriage guide axis 62 and moves back and forth.

A printing head 22 is mounted in the carriage 20. The printing head 22 includes multiple nozzles which respectively eject ink in the Z direction onto a portion which faces the medium P. The printing head 22 is divided into approximately four blocks for color printing. The multiple blocks respectively eject black (Bk) ink, cyan (C) ink, magenta (M) ink, and yellow (Y).

There is provided a configuration in which various control signals or the like, which include a drive signal from a main substrate (omitted in FIG. 1) through a flexible flat cable 190, are supplied to the carriage 20.

The printing apparatus 1 includes a transport mechanism 8 which transports the medium P on a platen 80. The transport mechanism 8 includes a transport motor 81 which is a drive source, and a transport roller 82 which is rotated by the transport motor 81 and transports the medium P in a sub-scanning direction (Y direction).

In the configuration, an image is formed on a surface of the medium P by ejecting ink in accordance with print data from the nozzles of the printing head 22 in accordance with main scanning of the carriage 20, and repeating an operation of transporting the medium P in accordance with the transport mechanism 8.

In the present embodiment, the main scanning is performed by moving the carriage 20, but may be performed by moving the medium P, and may be performed by moving both the carriage 20 and the medium P. The point is that there may be provided a configuration in which the medium P and the carriage 20 (printing head 22) move relatively.

Figure 2A:
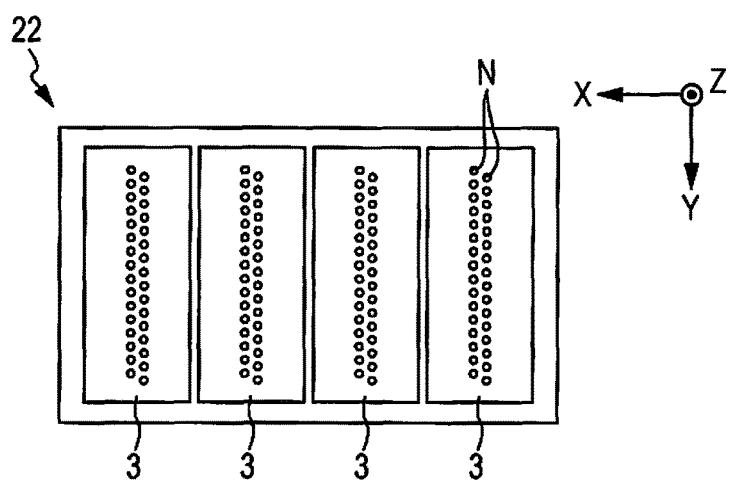
FIG. 2A is a diagram illustrating arrangement or the like of nozzles in a head unit.

FIG. 2A is a diagram illustrating a configuration in a case in which an ejecting surface of ink in the printing head 22 is viewed from the medium P. As illustrated in FIG. 2A, the printing head 22 includes four head units 3. The four head units 3 are arranged in the X direction which is a main scanning direction in correspondence with black (Bk), cyan (C), magenta (M), and yellow (Y), respectively.

Figure 2B:
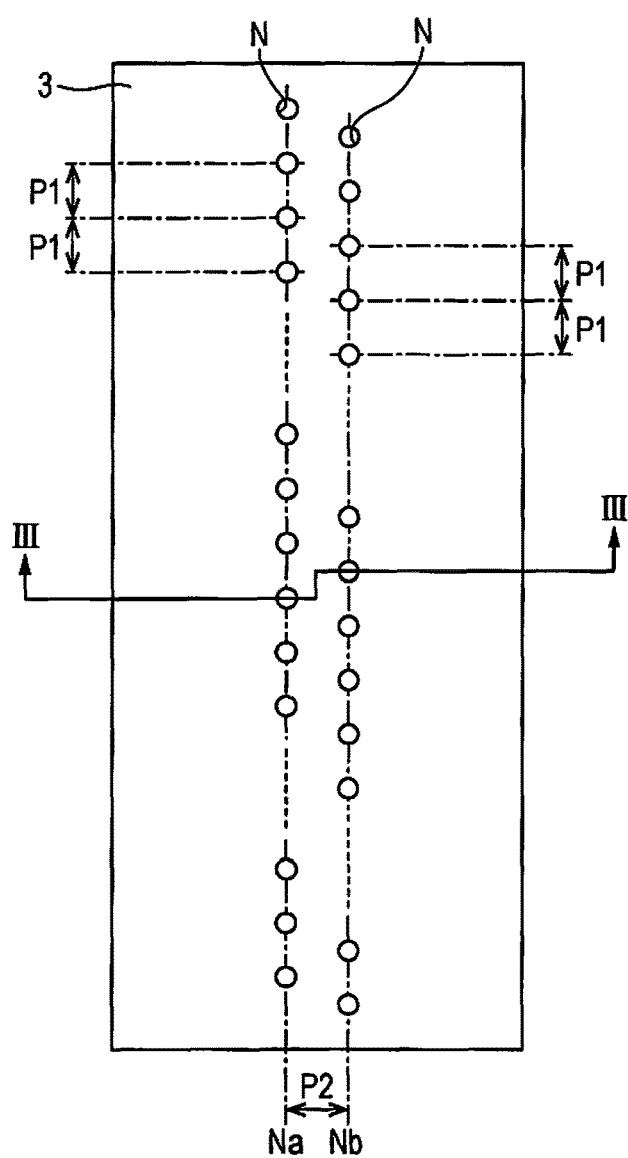
FIG. 2B is a diagram illustrating arrangement or the like of the nozzles in the head unit.

FIG. 2B is a diagram illustrating arrangement of nozzles in one head unit 3.

As illustrated in FIG. 2B, multiple nozzles N are arranged in two columns in one head unit 3. For the sake of convenience, the two columns are respectively referred to as a nozzle column Na and a nozzle column Nb.

Multiple nozzles N are respectively arranged in the Y direction which is a subscan direction by a pitch P1 in the nozzle columns Na and Nb. In addition, the nozzle columns Na and Nb are separated from each other by a pitch P2 in the X direction. The nozzles N in the nozzle column Na are shifted from the nozzles N in the nozzle column Nb by half of the pitch P1 in the Y direction.

In this way, the nozzles N are arranged so as to be shifted by half of the pitch P1 in the two columns of the nozzle columns Na and Nb in the Y direction, and thereby it is possible to increase resolution in the Y direction substantially twice as much as a case of one column.

The number of nozzles N in one head unit 3 is referred to as m (m is an integer greater than or equal to 2) for the sake of convenience.

While not illustrated in particular, the head unit 3 has a configuration in which a flexible substrate is coupled to an actuator substrate, and an IC is mounted on the flexible substrate. Hence, next, a structure of the actuator substrate will be described.

Figure 3:
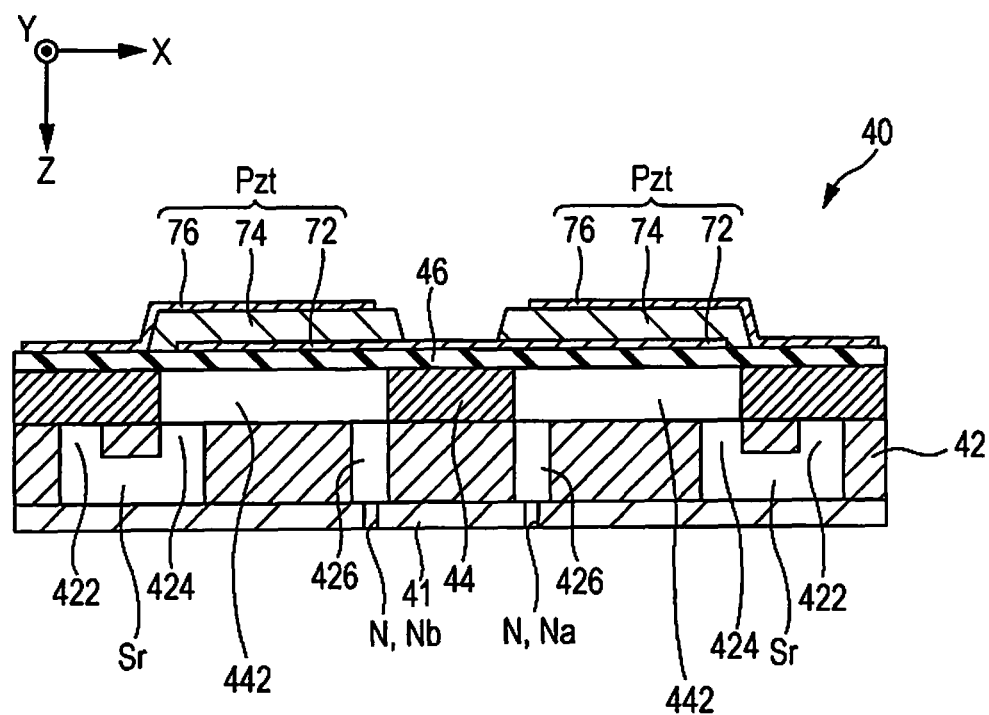
FIG. 3 is a sectional view illustrating an essential configuration of the head unit.

FIG. 3 is a sectional view illustrating a structure of the actuator substrate. In detail, FIG. 3 is a view illustrating a cross section taken along line of FIG. 2B.

As illustrated in FIG. 3, the actuator substrate 40 has a structure in which a pressure chamber substrate 44 and a vibration plate 46 are provided on a surface on a negative side in the Z direction and a nozzle plate 41 is provided on a surface on a positive side in the Z direction, in a flow path substrate 42.

Schematically, each element of the actuator substrate 40 is a member of an approximately flat plate which is long in the Y direction, and is fixed to each other by for example, an adhesive or the like. In addition, the flow path substrate 42 and the pressure chamber substrate 44 are formed by, for example, a single crystal substrate of silicon.

The nozzles N are formed in the nozzle plate 41. A structure corresponding to the nozzles in the nozzle column Na is shifted from a structure corresponding to the nozzles in the nozzle column Nb by half of the pitch P1 in the Y direction, but the nozzles are formed approximately symmetrically except for that, and thus, the structure of the actuator substrate 40 will be hereinafter described by focusing on the nozzle column Na.

The flow path substrate 42 is a flat member which forms a flow path of ink, and includes an opening 422, a supply flow path 424, and a communication flow path 426. The supply flow path 424 and the communication flow path 426 are formed in each nozzle, and the opening 422 is continuously formed over the multiple nozzles and has a structure in which ink with a corresponding color is supplied. The opening 422 functions as a liquid reservoir chamber Sr, and a bottom surface of the liquid reservoir chamber Sr is configured by, for example, the nozzle plate 41. In detail, the nozzle plate 41 is fixed to the bottom surface of the flow path substrate 42 so as to close the opening 422, the supply flow path 424, and the communication flow path 426 which are in the flow path substrate 42.

The vibration plate 46 is installed on a surface on a side opposite to the flow path substrate 42, in the pressure chamber substrate 44. The vibration plate 46 is a member of an elastically vibratile flat plate, and is configured by stacking an elastic film formed of an elastic material such as a silicon oxide, and an insulating film formed of an insulating material such as a zirconium oxide. The vibration plate 46 and the flow path substrate 42 face each other with an interval in the inner side of each opening 422 of the pressure chamber substrate 44. A space between the flow path substrate 42 and the vibration plate 46 in the inner side of each opening 422 functions as a cavity 442 which provides pressure to ink. Each cavity 442 communicates with the nozzle N through the communication flow path 426 of the flow path substrate 42.

A piezoelectric element Pzt is formed in each nozzle N (cavity 442) on a surface on a side opposite to the pressure chamber substrate 44 in the vibration plate 46.

The piezoelectric element Pzt includes a common drive electrode 72 formed over the multiple piezoelectric elements Pzt formed on a surface of the vibration plate 46, a piezoelectric body 74 formed on a surface of the drive electrode 72, and individual drive electrodes 76 formed in each piezoelectric element Pzt on a surface of the piezoelectric body 74. In the configuration, a region in which the piezoelectric body 74 is interposed between the drive electrode 72 and the drive electrode 76 which face each other, functions as the piezoelectric element Pzt.

The piezoelectric body 74 is formed in a process which includes, for example, a heating process (baking). In detail, the piezoelectric body 74 is formed by baking a piezoelectric material which is applied to a surface of the vibration plate 46 on which multiple drive electrodes 72 are formed, using heating processing of a furnace, and then molding (milling by using, for example, plasma) the baked material for each piezoelectric element Pzt.

In the same manner, the piezoelectric element Pzt corresponding to the nozzle column Nb is also configured to include the drive electrode 72, the piezoelectric body 74, and the drive electrode 76.

In addition, in this example, in the piezoelectric body 74, the common drive electrode 72 is used as a lower layer and the individual drive electrodes 76 are used as an upper layer, but in contrast to this, a configuration in which the common drive electrode 72 is used as an upper layer and the individual drive electrodes 76 are used as a lower layer, may be provided.

A configuration may be provided in which the IC is directly mounted in the actuator substrate 40.

As will be described below, meanwhile a voltage Vout of a drive signal according to the amount of ink to be ejected is individually applied to the drive electrode 76 which is a terminal of the piezoelectric element Pzt, a retention signal of a voltage $V_{BS}$ is commonly applied to the drive electrode 72 which is the other terminal of the piezoelectric element Pzt.

For this reason, the piezoelectric element Pzt becomes displaced upwardly or downwardly in accordance with a voltage which is applied to the drive electrodes 72 and 76. In detail, if the voltage Vout of the drive signal which is applied through the drive electrode 76 decreases, the central portion of the piezoelectric element Pzt is bent upwardly with respect to both end portions, and meanwhile, if the voltage Vout increases, the central portion of the piezoelectric element Pzt is bent downwardly.

If the central portion is bent upwardly, an internal volume of the cavity 442 increases (pressure decreases), and thus ink is drawn from the liquid reservoir chamber Sr. Meanwhile, if the central portion is bent downwardly, an internal volume of the cavity 442 decreases (pressure increases), and thus, an ink droplet is ejected from the nozzle N in accordance with the decreased degree. In this way, if a proper drive signal is applied to the piezoelectric element Pzt, ink is ejected from the nozzle N in accordance with the displacement of the piezoelectric element Pzt. For this reason, an ejecting unit which ejects ink in accordance with at least the piezoelectric element Pzt, the cavity 442, or the nozzle N, is configured.

Next, an electrical configuration of the printing apparatus 1 will be described.

Figure 4:
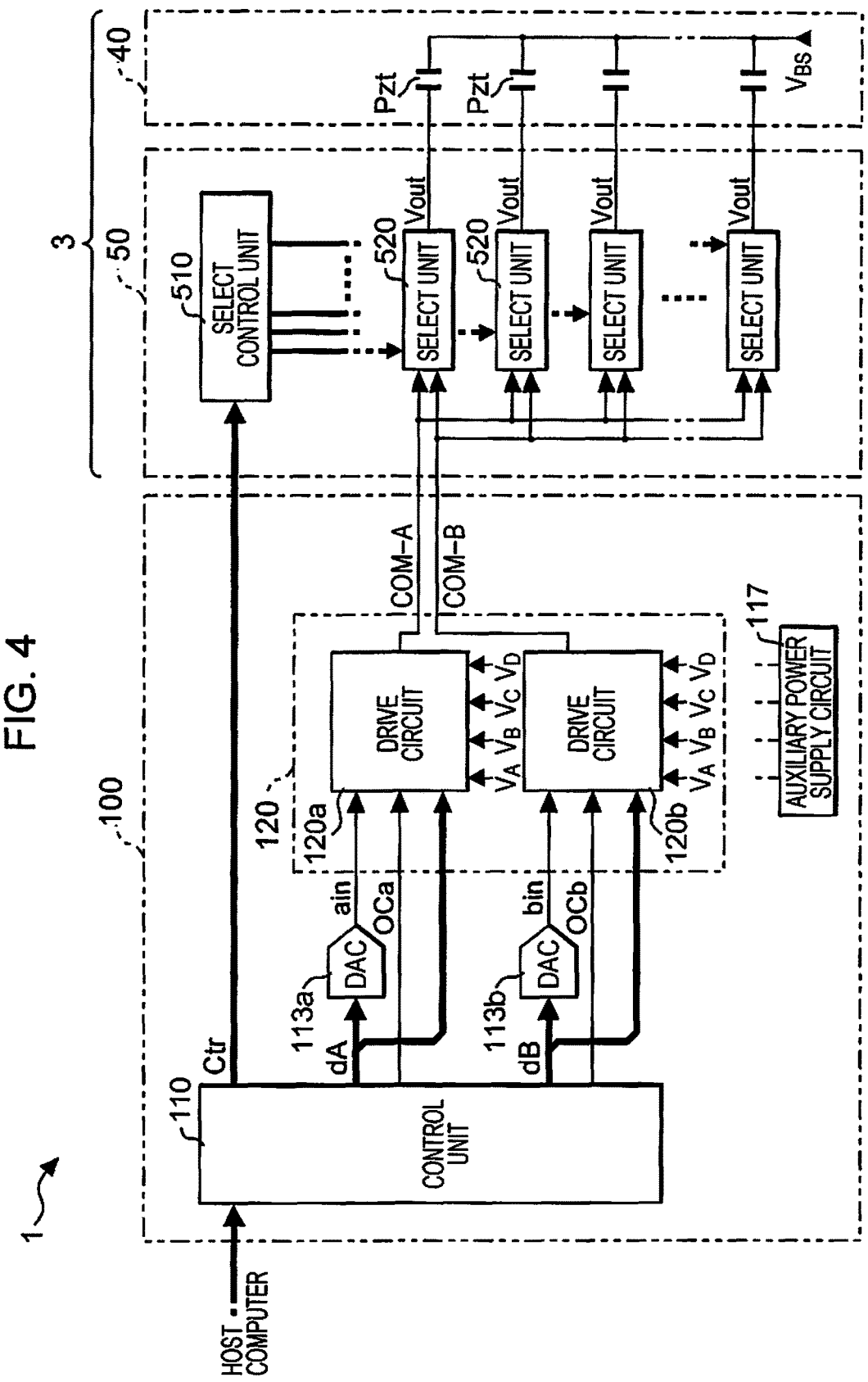
FIG. 4 is a block diagram illustrating an electrical configuration of the printing apparatus.

FIG. 4 is a block diagram illustrating an electrical configuration of the printing apparatus 1.

As illustrated in FIG. 4, the printing apparatus 1 has a configuration in which the head unit 3 is coupled to a main substrate 100 through flexible flat cable (not illustrated in FIG. 4). The head unit 3 is largely divided into the actuator substrate 40 and a chip on film (COF) 50, and among these, the COF 50 is obtained by mounting an integrated circuit onto a film substrate. The main substrate 100 supplies a control signal Ctr or drive signals COM-A and COM-B to the COF 50.

The printing apparatus 1 includes four head units 3 and the main substrate 100 that is a circuit substrate independently controls the four head units 3. The four head units 3 are the same as each other except that the colors of ink to be ejected are different from each other, and thus, hereinafter, one head unit 3 will be representatively described for the sake of convenience.

As illustrated in FIG. 4, the main substrate 100 includes a control unit 110, D/A converters (Digital Analog Converter, DAC) 113a and 113b, a drive circuit 120, and an auxiliary power supply circuit 117.

Among these, the control unit 110 is a type of a microcontroller having a CPU, a RAM, a ROM, and the like, and outputs various control signals or the like for controlling each unit by executing a predetermined program, when image data which becomes a printing target is supplied from a host computer or the like.

In detail, first, the control unit 110 repeatedly supplies digital data dA to the DAC 113a, and repeatedly supplies digital data dB to the DAC 113b in the same manner. Here, the data dA defines a waveform of the drive signal COM-A which is supplied to the head unit 3, and the data dB defines a waveform of the drive signal COM-B.

Second, the control unit 110 outputs the signal OCa in accordance with the data dA which is supplied, and outputs the signal OCb in accordance with the data dB which is supplied.

Third, the control unit 110 supplies various control signals Ctr to the head unit 3, in synchronization with control for the moving mechanism 6 and the transport mechanism 8. The control signal Ctr which is supplied to the head unit 3 includes print data (ejection control signal) which defines the amount of ink which is ejected from the nozzle N, a clock signal which is used for transmission of the print data, a timing signal which defines a print period or the like, and the like.

The control unit 110 controls the moving mechanism 6 and the transport mechanism 8, but such a configuration is known, and thus, description thereof will be omitted.

The DAC 113a converts the digital data dA into analog signal ain to supply to the drive circuit 120a, and the DAC 113b converts the digital data dB into analog signal bin to supply to the drive circuit 120b.

The drive circuit 120 is an assembly including two drive circuits 120a and 120b in the example of the figure. In this sense, the drive circuit 120 will also be called a drive circuit group.

The drive circuit 120a, which will be described below in detail, voltage-amplifies a signal ain by, for example, 10 times using voltages $V_A$, $V_B$, $V_C$, and $V_D$ so as to be able to drive a plurality of the piezoelectric elements Pzt which are loads, and converts the signal into low impedance, and outputs the signal as the drive signal COM-A. In the same manner, the drive circuit 120b voltage-amplifies the signal Bin by 10 times using the voltages $V_A$, $V_B$, $V_C$, and $V_D$, converts the signal into low impedance, and outputs the signal as the drive signal COM-B.

The auxiliary power supply circuit 117 generates the voltages $V_A$, $V_B$, $V_C$, and $V_D$ which are used for drive circuits 120a and 120b.

The signal ain which is obtained by performing analog conversion and the drive signal COM-A have trapezoidal waveforms as will be described below, and the signal OCa is output in accordance with the trapezoidal waveform. In the same manner, the signal bin which is obtained by performing analog conversion and the drive signal COM-B also have trapezoidal waveforms, and the signal OCb is output in accordance with the trapezoidal waveform. Waveforms of the drive signals COM-A (ain) and COM-B (bin) and the signals OCa and OCb will be described below.

In addition, the signal ain (bin) which is converted by the DAC 113a (113b) performs a relatively small swing in a range of a voltage of, for example, approximately 0 V to 4 V, and in contrast to this, the drive signal COM-A (COM-B) performs a relatively large swing in a range of a voltage of, for example, approximately 0 V to 40 V.

Meanwhile, in the head unit 3, the integrated circuit of the COF 50 includes functions of a select control unit 510 and select units 520 corresponding to the piezoelectric elements Pzt one to one. Among these, the select control unit 510 controls selection of each of the select units 520. In detail, the select control unit 510 stores the print data which is supplied in synchronization with a clock signal from the control unit 110 by the amount of several nozzles (piezoelectric elements Pzt) of the head unit 3 once, and instructs each select unit 520 to select the drive signals COM-A and COM-B in accordance with the print data at a start timing of a print period which is defined by a timing signal.

Each select unit 520 selects (or does not select any one) one of the drive signals COM-A and COM-B in accordance with instruction of the select control unit 510, and applies the selected signal to one terminal of the corresponding piezoelectric element Pzt as a drive signal of the voltage Vout.

As described above, one piezoelectric element Pzt is provided in each nozzle N in the actuator substrate 40. The other terminals of each piezoelectric element Pzt are coupled in common, and the voltage $V_{BS}$ is applied by a circuit which is not illustrated. The voltage $V_{BS}$ maintains the other terminals of the plurality of the piezoelectric elements Pzt in a constant state.

In the present embodiment, ink is ejected from one nozzle N maximum twice by one dot, and thus four gradations of a large dot, a medium dot, a small dot, and no record are represented. In the present embodiment, in order to represent the four gradations, two types of the drive signals COM-A and COM-B are prepared, and each period has first half pattern and a second half pattern. Then, during one period, the drive signals COM-A and COM-B are selected (or not selected) in accordance with a gradation to be represented in the first half and a second half, and the selected signal is supplied to the piezoelectric element Pzt.

Thus, the drive signals COM-A and COM-B will be first described, and thereafter, a detailed configuration of the select control unit 510 for selecting the drive signals COM-A and COM-B, and the select unit 520 will be described.

Figure 5:
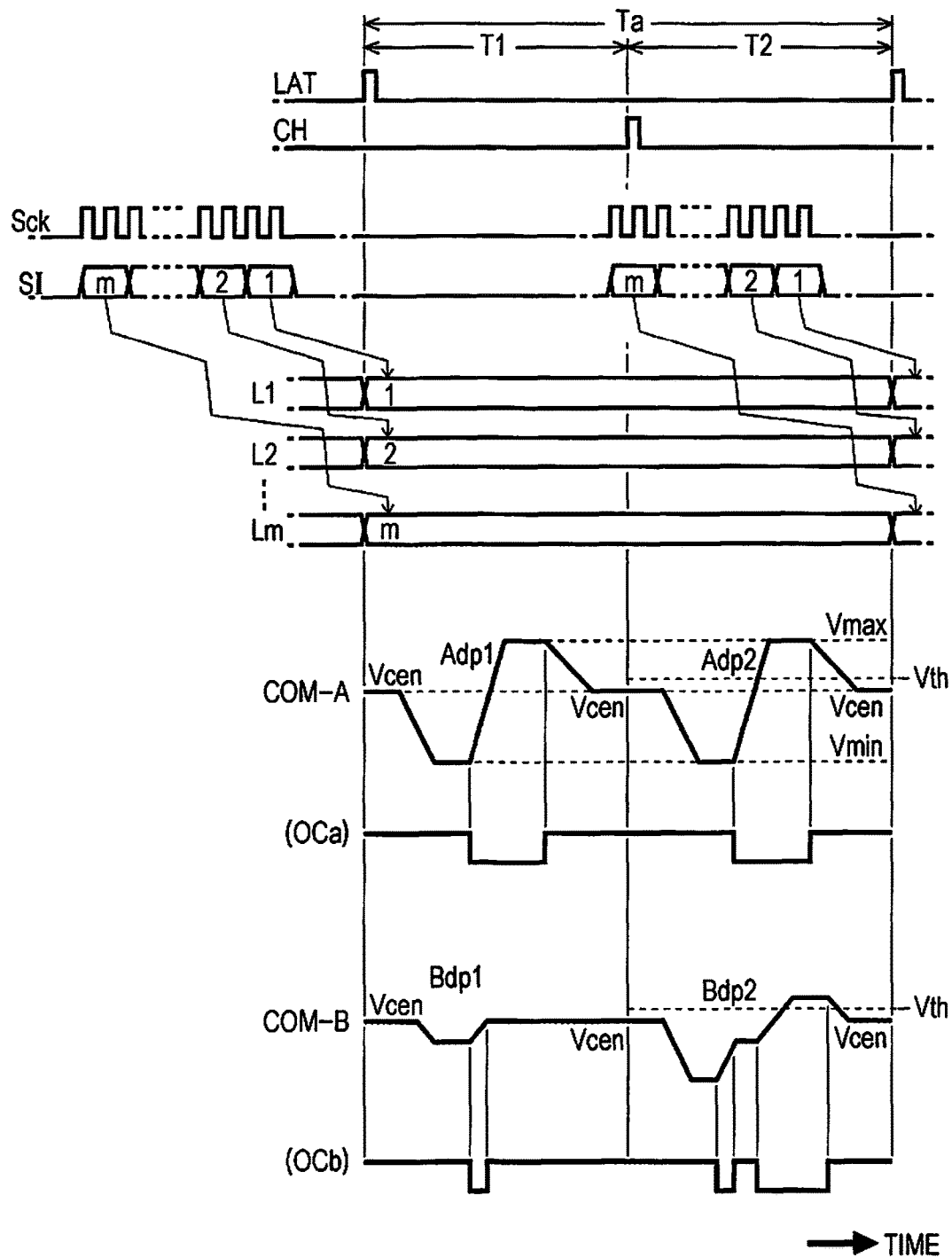
FIG. 5 is a diagram illustrating waveforms or the like of drive signals.

FIG. 5 is a diagram illustrating waveforms or the like of drive signals COM-A and COM-B.

As illustrated in FIG. 5, the drive signal COM-A is configured by a repeated waveform of a trapezoidal waveform Adp1 which is disposed during a period T1 from time when a control signal LAT is output (rises) to time when a control signal CH is output, during a print period Ta, and a trapezoidal waveform Adp2 which is disposed during a period T2 from time when the control signal CH is output and to the control signal LAT is output during the print period Ta.

In the present embodiment, the trapezoidal waveforms Adp1 and Adp2 are approximately the same waveforms as each other, and are waveforms which eject ink of a predetermined amount, specifically, an approximately medium amount from the nozzle N corresponding to the piezoelectric elements Pzt, if each waveform is supplied to the drive electrode 76 which is one terminal of the piezoelectric elements Pzt.

The drive signal COM-B is configured by a repeated waveform of a trapezoidal waveform Bdp1 which is disposed during the period T1 and a trapezoidal waveform Bdp2 which is disposed during the period T2. In the present embodiment, the trapezoidal waveforms Bdp1 and Bdp2 are waveforms different form each other. Among these, the trapezoidal waveform Bdp1 is a waveform for preventing an increase of viscosity of ink by slightly vibrating the ink near the nozzle N. For this reason, even if the trapezoidal waveform Bdp1 is supplied to the one terminal of the piezoelectric element Pzt, ink is not ejected from the nozzle N corresponding to the piezoelectric element Pzt. In addition, the trapezoidal waveform Bdp2 is a waveform different from the trapezoidal waveform Adp1 (Adp2). If the trapezoidal waveform Bdp2 is supplied to the one terminal of the piezoelectric element Pzt, the trapezoidal waveform Bdp2 becomes a waveform which ejects the amount of ink less than the predetermined amount from the nozzle N corresponding to the piezoelectric element Pzt.

Voltages at a start timing of the trapezoidal waveforms Adp1, Adp2, Bdp1, and Bdp2, and voltages at an end timing of the trapezoidal waveforms Adp1, Adp2, Bdp1, and Bdp2 are all common at a voltage Vcen. That is, the trapezoidal waveforms Adp1, Adp2, Bdp1, and Bdp2 are waveforms which respectively start at the voltage Vcen and ends at the voltage Vcen.

As described above, since the drive circuit 120a (120b) voltage-amplifies the signal ain (bin) by 10 times, impedance-converts the amplified signal, and outputs the signal as the drive signal COM-A (COM-B). For this reasons, there is a slight difference between a waveform of the signal ain (bin) and a waveform of the drive signal COM-A (COM-B) and thus, the two waveforms may be considered to be different from each other.

The control unit 110 outputs the signal OCa having the following logic level with respect to the trapezoidal waveform of the drive signal COM-A to the drive circuit 120a.

In detail, the control unit 110 makes the signal OCa go to an H level during a period in which a voltage of the drive signal COM-A (signal ain) decreases and a period in which the drive signal COM-A is constant at a voltage lower than a threshold value Vth, and other than that, makes the signal OCa go to an L level during a period in which the voltage of the drive signal COM-A increases and a period in which the drive signal COM-A is constant at a voltage higher than or equal to the threshold value Vth.

In the present example, when a maximum value of the voltage of the drive signal COM-A is referred to as max and a minimum value thereof is referred to as min, description will be made as a relationship of max>Vth>Vcen>min for the sake of convenient. The relationship may be max>Vcen Vth>min.

In the same manner, the control unit 110 outputs a signal OCb having the following logic level with respect to the trapezoidal waveform of the drive signal COM-B to the drive circuit 120b. In detail, the control unit 110 makes the signal OCb go to an H level during a period in which a voltage of the drive signal COM-B (signal Bin) decreases and a period in which the drive signal COM-B is constant at a voltage lower than the threshold value Vth, and other than that, go to an L level during a period in which the voltage of the drive signal COM-B increases and a period in which the drive signal COM-B is constant at a voltage higher than or equal to the threshold value Vth.

Figure 6:
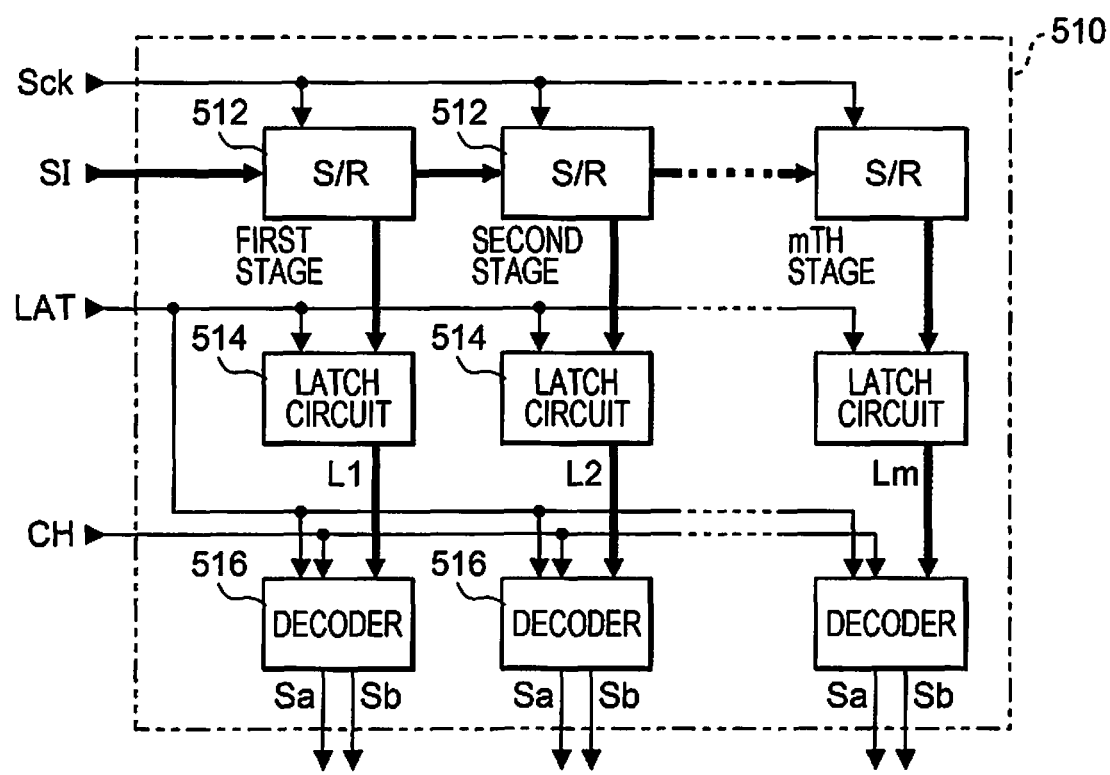
FIG. 6 is a diagram illustrating a configuration of a select control unit.

FIG. 6 is a diagram illustrating a configuration of the select control unit 510 of FIG. 4.

As illustrated in FIG. 6, a clock signal Sck, the print data SI, and the control signals LAT and CH are supplied to the select control unit 510. Multiple sets of a shift register (S/R) 512, a latch circuit 514, and a decoder 516 are provided in correspondence with each of the piezoelectric elements Pzt (nozzles N) in the select control unit 510.

The print data SI is data which defines dots to be formed by all the nozzles N in the head unit 3 which is focused during the print period Ta. In the present embodiment, in order to represent the four gradations of no record, a small dot, a medium dot, and a large dot, the print data for one nozzle is configured by two bits of a most significant bit (MSB) and a least significant bit (LSB).

The print data SI is supplied in accordance with transport of the medium P for each nozzle N (piezoelectric element Pzt) in synchronization with the clock signal Sck. The shift register 512 has a configuration in which the print data SI of two bits is retained once in correspondence with the nozzle N.

In detail, shift registers 512 of total m stages corresponding to each of m piezoelectric elements Pzt (nozzles) are coupled in cascade, and the print data SI which is supplied to the shift register 512 of a first stage located at a left end of FIG. 6 is sequentially transmitted to the rear stage (downward side) in accordance with the clock signal Sck.

In FIG. 6, in order to separate the shift registers 512, the shift register 512 are sequentially referred to as a first stage, a second stage, . . . , an mth stage from an upper side to which the print data SI is supplied.

The latch circuit 514 latches the print data SI retained in the shift register 512 at a rising edge of the control signal LAT.

The decoder 516 decodes the print data SI of two bits which are latched in the latch circuit 514, outputs select signals Sa and Sb for each of periods T1 and T2 which are defined by the control signal LAT and the control signal CH, and defines select of the select unit 520.

Figures 7, 8:
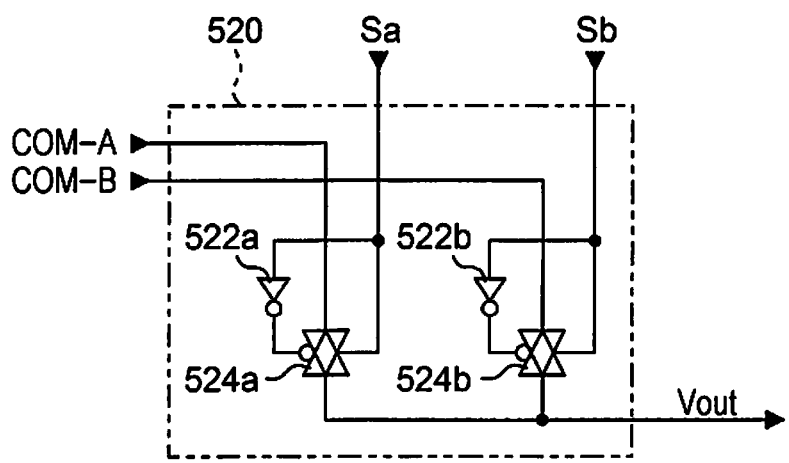
FIG. 7 is a diagram illustrating decoded content of a decoder.
FIG. 8 is a diagram illustrating a configuration of a select unit.

FIG. 7 is a diagram illustrating decoded content of the decoder 516.

In FIG. 7, the print data SI of two bits which are latched is referred to as an MSB and an LSB. In the decoder 516, if the latched print data SI is (0,1), it means that logic levels of the select signals Sa and Sb are respectively output as levels of H and L during the period T1, and levels of L and H during the period T2.

The logic levels of the select signals Sa and Sb are level-shifted by a level shifter (not illustrated) to a higher amplitude logic than the logic levels of the clock signal Sck, the print data SI, and the control signals LAT and CH.

FIG. 8 is a diagram illustrating a configuration of the select unit 520 of FIG. 4.

As illustrated in FIG. 8, the select unit 520 includes inverters (NOT circuit) 522a and 522b, and transfer gates 524a and 524b.

The select signal Sa from the decoder 516 is supplied to a positive control terminal to which a round mark is not attached in the transfer gate 524a, is logically inverted by the inverter 522a, and is supplied to a negative control terminal to which a round mark is attached in the transfer gate 524a. In the same manner, the select signal Sb is supplied to a positive control terminal of the transfer gate 524b, is logically inverted by the inverter 522b, and is supplied to a negative control terminal of the transfer gate 524b.

The drive signal COM-A is supplied to an input terminal of the transfer gate 524a, and the drive signal COM-B is supplied to an input terminal of the transfer gate 524b. The output terminals of the transfer gates 524a and 524b are coupled to each other, and are coupled to one terminal of the corresponding piezoelectric element Pzt.

If the select signal Sa goes to an H level, the input terminal and the output terminal of the transfer gate 524a are electrically coupled (ON) to each other. If the select signal Sa goes to an L level, the input terminal and the output terminal of the transfer gate 524a are electrically decoupled (OFF) from each other. In the same manner, the input terminal and the output terminal of the transfer gate 524b are also electrically coupled to each other or decoupled from each other in accordance with the select signal Sb.

As illustrated in FIG. 5, the print data SI is supplied to each nozzle in synchronization with the clock signal Sck, and is sequentially transmitted to the shift registers 512 corresponding to the nozzles. Thus, if supply of the clock signal Sck is stopped, the print data SI corresponding to each nozzle is retained in each of the shift registers 512.

If the control signal LAT rises, each of the latch circuits 514 latches all of the print data SI retained in the shift registers 512. In FIG. 5, the number in L1, L2, . . . , Lm indicate the print data SI which is latched by the latch circuits 514 corresponding to the shift registers 512 of the first stage, the second stage, . . . , the mth stage.

The decoder 516 outputs the logic levels of the select signals Sa and Sb in the content illustrated in FIG. 7 in accordance with the size of the dots which are defined by the latched print data SI during the periods T1 and T2.

That is, first, the decoder 516 sets the select signals Sa and Sb to levels of H and L during the period T1 and levels of H and L even during the period T2, if the print data SI is (1,1) and the size of the large dot is defined. Second, the decoder 516 sets the select signals Sa and Sb to levels of H and L during the period T1 and levels of L and H during the period T2, if the print data SI is (0,1) and the size of the medium dot is defined. Third, the decoder 516 sets the select signals Sa and Sb to levels of L and L during the period T1 and levels of L and H during the period T2, if the print data SI is (1,0) and the size of the small dot is defined. Fourth, the decoder 516 sets the select signals Sa and Sb to levels of L and H during the period T1 and levels of L and L during the period T2, if the print data SI is (0,0) and no record is defined.

Figure 9:
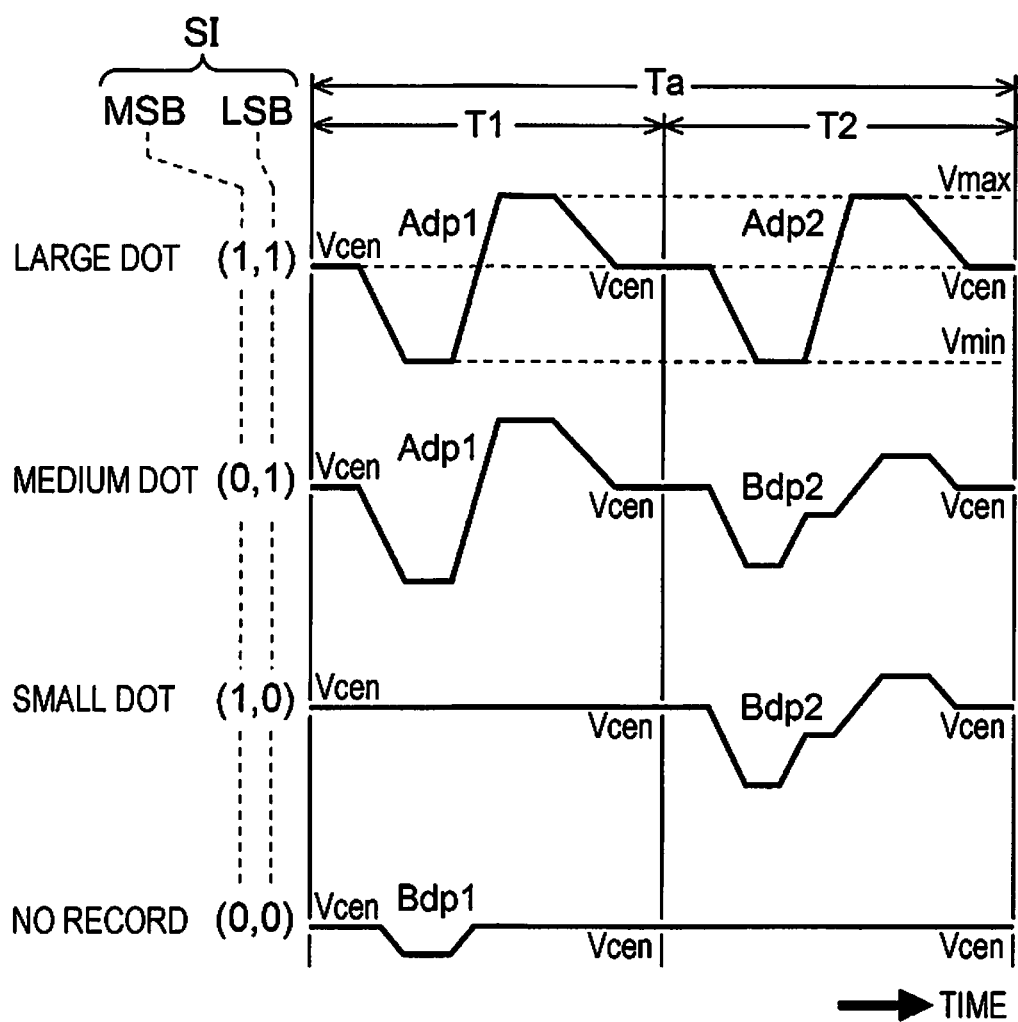
FIG. 9 is a diagram illustrating the drive signals which are supplied from the select unit to a piezoelectric element.

FIG. 9 is a diagram illustrating waveforms of the drive signals which are selected in accordance with the print data SI and are supplied to one terminal of the piezoelectric element Pzt.

When the print data SI is (1,1), the select signals Sa and Sb become H and L levels during the period T1, and thus the transfer gate 524a is turned on, and the transfer gate 524b is turned off. For this reason, the trapezoidal waveform Adp1 of the drive signal COM-A is selected during the period T1. Since the select signals Sa and Sb go to H and L levels even during the period T2, the select unit 520 selects the trapezoidal waveform Adp2 of the drive signal COM-A.

In this way, if the trapezoidal waveform Adp1 is selected during the period T1, the trapezoidal waveform Adp2 is selected during the period T2, and the selected waveforms are supplied to one terminal of the piezoelectric element Pzt as drive signals, ink of an approximately medium amount is ejected twice from the nozzle N corresponding to the piezoelectric element Pzt. For this reason, each ink is landed on and combined with the medium P, and as a result, a large dot is formed as defined by the print data SI.

When the print data SI is (0,1), the select signals Sa and Sb become H and L levels during the period T1, and thus the transfer gate 524a is turned on, and the transfer gate 524b is turned off. For this reason, the trapezoidal waveform Adp1 of the drive signal COM-A is selected during the period T1. Next, since the select signals Sa and Sb go to L and H levels during the period T2, the trapezoidal waveform Bdp2 of the drive signal COM-B is selected.

Hence, ink of an approximately medium amount and an approximately small amount is ejected twice from the nozzle N. For this reason, each ink is landed on and combined with the medium P, and as a result, a medium dot is formed as defined by the print data SI.

When the print data SI is (1,0), the select signals Sa and Sb become all L levels during the period T1, and thus the transfer gates 524a and 524b are turned off. For this reason, the trapezoidal waveforms Adp1 and Bdp1 are not selected during the period T1. If the transfer gates 524a and 524b are all turned off, a path from a coupling point of the output terminals of the transfer gates 524a and 524b to one terminal of the piezoelectric element Pzt becomes a high impedance state in which the path is not electrically coupled to any portion. However, both terminals of the piezoelectric element Pzt retain a voltage (Vcen-$V_{BS}$) shortly before the transfer gates are turned off, by capacitance included in the piezoelectric element Pzt itself.

Next, since the select signals Sa and Sb go to L and H levels during the period T2, the trapezoidal waveform Bdp2 of the drive signal COM-B is selected. For this reason, ink of an approximately small amount is ejected from the nozzle N only during the period T2, and thus small dot is formed on the medium P as defined by the print data SI.

When the print data SI is (0,0), the select signals Sa and Sb become L and H levels during the period T1, and thus the transfer gates 524a is turned off and the transfer gate 524b is turned on. For this reason, the trapezoidal waveforms Bdp1 of the drive signal COM-B is selected during the period T1. Next, since all of the select signals Sa and Sb go to L levels during the period T2, the trapezoidal waveforms Adp2 and Bdp2 are all not selected.

For this reason, ink near the nozzle N just slightly vibrates during the period T1, and the ink is not ejected, and thus, as a result, dots are not formed, that is, no record is made as defined by the print data SI.

In this way, the select unit 520 selects (or does not select) the drive signals COM-A and COM-B in accordance with instruction of the select control unit 510, and applies the selected signal to one terminal of the piezoelectric element Pzt. For this reason, each of the piezoelectric elements Pzt is driven in accordance with the size of the dot which is defined by the print data SI.

The drive signals COM-A and COM-B illustrated in FIG. 5 are just an example. Actually, combinations of various waveforms which are prepared in advance are used in accordance with properties, transport speed, or the like of the medium P.

In addition, here, an example in which the piezoelectric element Pzt is bent upwardly in accordance with a decrease of a voltage is used, but if a voltage which is applied to the drive electrodes 72 and 76 is inverted, the piezoelectric element Pzt is bent downwardly in accordance with a decrease of the voltage. For this reason, in a configuration in which the piezoelectric element Pzt is bent downwardly in accordance with a decrease of a voltage, the drive signals COM-A and COM-B illustrated in the figure have waveforms which are inverted by using the voltage Vcen as a reference.

Next, the drive circuits 120a and 120b of the main substrate 100 will be described.

The drive circuits 120a and 120b are the same configuration as each other except signals which are input and signals which are output. Hence, the drive circuit 120a on a side which outputs the drive signal COM-A will be described as an example.

Figure 10:
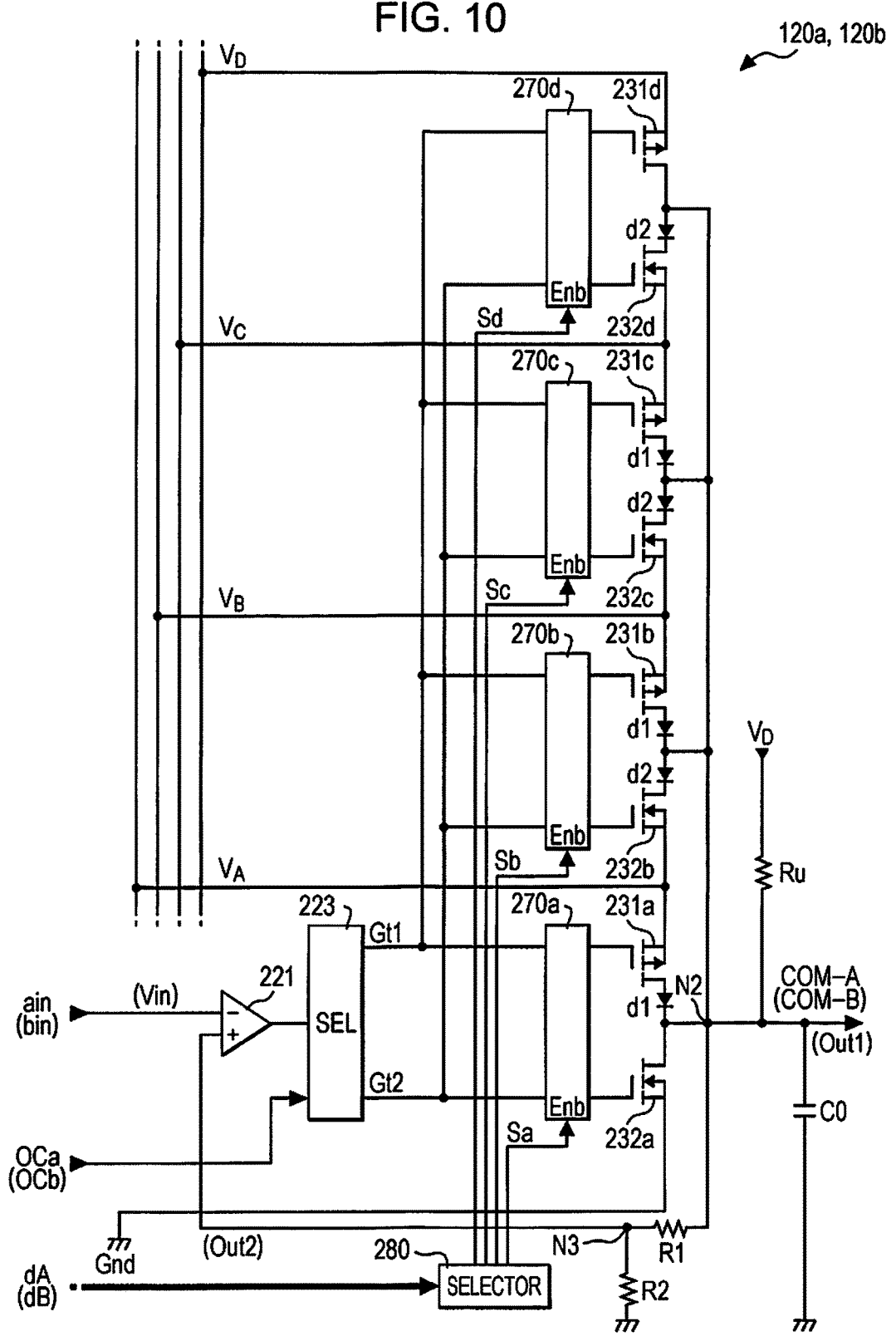
FIG. 10 is a diagram illustrating a configuration of the drive circuit.

FIG. 10 is a diagram illustrating a configuration of the drive circuit 120a.

As illustrated in this figure, the drive circuit 120a includes a differential amplifier 221, a selector 223, gate selectors 270a, 270b, 270c, and 270d, a selector 280, four pairs of transistors, resistance elements Ru, R1, and R2, and a capacitor C1.

In addition, the drive circuit 120a receives the voltages $V_A$, $V_B$, $V_C$, and $V_D$ which are generated by the auxiliary power supply circuit 117.

Figure 11:
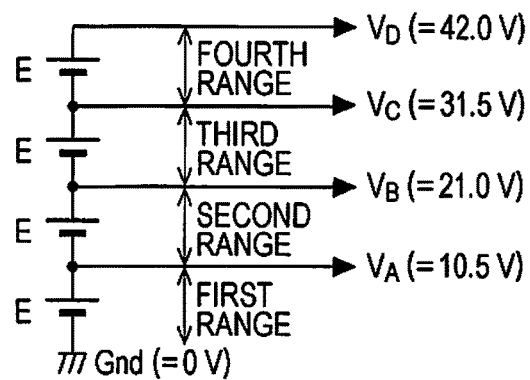
FIG. 11 is a diagram illustrating an operation of the drive circuit.

FIG. 11 is a diagram illustrating the voltages $V_A$, $V_B$, $V_C$, and $V_D$.

As described in this figure, the auxiliary power supply circuit 117 has a configuration in which voltages E, 2E, 3E, and 4E which are obtained by serially coupling reference power supplies, each outputting, for example, a voltage E, in four stages are respectively output as voltages $V_A$, $V_B$, $V_C$, and $V_D$.

Here, when the voltage E is set to, for example, 10.5 V, the voltages $V_A$, $V_B$, $V_C$, and $V_D$ are respectively 10.5 V, 21.0 V, 31.5 V, and 42.0 V.

In the present embodiment, the following voltage ranges are defined in accordance with the voltages $V_A$, $V_B$, $V_C$, and $V_D$, that is, a range higher than or equal to the ground Gnd of zero volts and lower than the voltage $V_A$ is defined as a first range, a range higher than or equal to the voltage $V_A$ and lower than the voltage $V_B$ is defined as a second range, a range higher than or equal to the voltage $V_B$ and lower than the voltage $V_C$ is defined as a third range, and a range higher than or equal to the voltage $V_C$ and lower than the voltage $V_D$ is defined as a fourth range.

Returning to the description of FIG. 10, the signal ain is supplied to a negative input terminal (−) of the differential amplifier 221, and Meanwhile, a voltage Out2 of a node N3 is applied to a positive input terminal (+) thereof. Here, if a voltage of the signal ain is referred to as a voltage Vin, the differential amplifier 221 amplifies a difference voltage which is obtained by subtracting the voltage Vin of the signal ain with a small amplitude which is an input from the voltage Out2, and outputs the amplified voltage.

In addition, while not illustrated, in the differential amplifier 221, for example, a low side of the power supplies is referred to as a ground Gnd, and a high side of the power supplies is referred to as $V_A$. For this reason, an output voltage of the differential amplifier 221 is within a range from the ground Gnd to the voltage $V_A$. The power supplies of the differential amplifier 221 are not limited to this, and may use a low voltage such as 3.3 V.

The selector 280 discriminates a range of the voltage Vin of the signal ain, based on the data dA which is supplied from the control unit 110 (refer to FIG. 4), and outputs select signals Sa, Sb, Sc, and Sd in accordance with the discrimination result as follows.

In detail, in a case where the voltage Vin which is defined by the data dA is discriminated to be higher than or equal to 0 V and lower than 1.05 V, that is, in a case where a voltage at the time of amplifying the voltage Vin by 10 times is included in the first range, the selector 280 sets only the select signal Sa to an H level, and sets the other select signals Sb, Sc, and Sd to an L level.

In addition, in a case where the voltage Vin which is defined by the data dA is discriminated to be higher than or equal to 1.05 V and lower than 2.10 V, that is, in a case where a voltage at the time of amplifying the voltage Vin by 10 times is included in the second range, the selector 280 sets only the select signal Sb to an H level, and sets the other select signals Sa, Sc, and Sd to an L level.

In the same manner, in a case where the voltage Vin which is defined by the data dA is discriminated to be higher than or equal to 2.10 V and lower than 3.15 V, that is, in a case where a voltage at the time of amplifying the voltage Vin by 10 times is included in the third range, the selector 280 sets only the select signal Sc to an H level, and sets the other select signals Sa, Sb, and Sd to an L level. In a case where the voltage Vin is discriminated to be higher than or equal to 3.15 V and lower than 4.20 V, that is, in a case where a voltage at the time of amplifying the voltage Vin by 10 times is included in the fourth range, the selector 280 sets only the select signal Sd to an H level, and sets the other select signals Sa, Sb, and Sc to an L level.

The drive circuit 120b discriminates a range of the voltage Vin of the signal bin, based on the data dB and outputs the select signals Sa, Sb, Sc, and Sd in the same manner in accordance with the discriminated results.

Here, for the sake of convenient description, four pairs of transistors will be described.

In the example, the four pairs of transistors are configured by a pair of transistors 231a and 232a, a pair of transistors 231b and 232b, a pair of transistors 231c and 232c, and a pair of transistors 231d and 232d.

Among the respective pairs of transistors, the transistors 231a, 231b, 231c, an 231d on a high side are, for example, P-channel field effect transistors, and the transistors 232a, 232b, 232c, an 232d on a low side are, for example, N-channel field effect transistors.

In the transistor 231a, the voltage $V_A$ is applied to a source terminal thereof, and a drain terminal thereof is coupled to the node N2. In the transistor 232a, a source terminal thereof is coupled to the ground Gnd, and a drain terminal thereof is coupled to the node N2 in common.

In the same manner, in the transistor 231b (231c, 231d), the voltage $V_B$ ($V_C$, $V_D$) is applied to a source terminal thereof, and a drain terminal thereof is coupled to the node N2. In the transistor 232b (232c, 232d), the voltage $V_A$ ($V_B$, $V_C$) is applied to a source terminal thereof, and a drain terminal thereof is coupled to the node N2 in common.

While detailed description will be made below, when the gate selector 270a is enabled, the transistors 231a and 232a output drive signals by using the voltage $V_A$ and the ground Gnd as power supply voltages, and when the gate selector 270b is enabled, the transistors 231b and 232b output drive signals by using the voltage $V_B$ and the voltage $V_A$ as power supply voltages. In the same manner, when the gate selector 270c is enabled, the transistors 231c and 232c output drive signals by using the voltage $V_C$ and the voltage $V_B$ as power supply voltages, and when the gate selector 270d is enabled, the transistors 231d and 232d output drive signals by using the voltage $V_D$ and the voltage $V_C$ as power supply voltages.

In the aforementioned configuration, the power supply voltage of the transistors 231a and 232a, the power supply voltage of the transistors 231b and 232b, the power supply voltage of the transistors 231c and 232c, and the power supply voltage of the transistors 231d and 232d are all 10.5 V.

For example, in a case where the transistors 231a and 232a are referred to as a first pair of transistors, the transistors 231b and 232b become a second pair of transistors, and the first pair of transistors and the second pair of transistors are electrically coupled in series to each other.

When the select signal Sa which is supplied to an input terminal Enb is enabled to an H level, the gate selector 270a level-shifts the signals Gt1 and Gt2 which are output from the selector 223, and supplies the shifted signals to gate terminals of the transistors 231a and 232a, respectively.

In detail, when being enabled, the gate selector 270a level-shifts a range from a minimum voltage to a maximum voltage of the signal Gt1 into the first range from the ground Gnd to the voltage $V_A$, supplies the shifted signal to the gate terminal of the transistor 231a, level-shifts a range from a minimum voltage to a maximum voltage of the signal Gt2 into the first range, and supplies the shifted signal to the gate terminal of the transistor 232a. For this reasons, while not illustrated in particular, the selector 270a is configured to use, for example, the voltages $V_A$ and Gnd as power supplies.

If description is made to be limited to the gate selector 270a, a range from minimum voltages to maximum voltages of the signals Gt1 and Gt2 coincides with the first range, and thus, when being enabled, the signals Gt1 and Gt2 are respectively supplied to the gate terminals of the transistors 231a and 232a as they are.

In addition, in a case where the power supply of the differential amplifier 221 is set to a low voltage, when being enabled, the gate selector 270a level-shifts ranges from the minimum voltage of 0 V to the maximum voltage of 3.3 V of the signals Gt1 and Gt2 into the first range and supplies the sifted signals to the transistors 231a and 232a.

When being enabled, the gate selector 270b level-shifts the range from the minimum voltage to the maximum voltage of the signal Gt1 into the second range from the voltage $V_A$ to the voltage $V_B$, supplies the shifted signal to the gate terminal of the transistor 231b, level-shifts the range from the minimum voltage to the maximum voltage of the signal Gt2 into the second range, and supplies the shifted signal to the gate terminal of the transistor 232b. For this reasons, while not illustrated in particular, the gate selector 270b is configured to use, for example, the voltages $V_B$ and $V_A$ as power supplies.

If description is made to be limited to the gate selector 270b, when being enabled, 10.5 V is added to the signals Gt1 and Gt2 and the signals are supplied to the gate terminals of the transistors 231b and 232b.

In addition, in a case where the power supply of the differential amplifier 221 is set to a low voltage, when being enabled, the gate selector 270b level-shifts ranges from the minimum voltage of 0 V to the maximum voltage of 3.3 V of the signals Gt1 and Gt2 into the second range and supplies the sifted signals to gate terminals of the transistors 231b and 232b.

In the same manner, when being enabled, the gate selector 270c level-shifts the range from the minimum voltage to the maximum voltage of the signal Gt1 into the third range from the voltage $V_B$ to the voltage $V_C$, supplies the shifted signal to the gate terminal of the transistor 231c, level-shifts the range from the minimum voltage to the maximum voltage of the signal Gt2 into the third range, and supplies the shifted signal to the gate terminal of the transistor 232c. For this reasons, while not illustrated in particular, the gate selector 270c is configured to use, for example, the voltages $V_C$ and $V_B$ as power supplies.

If description is made to be limited to the gate selector 270c, when being enabled, 21.0 V is added to the signals Gt1 and Gt2 and the signals are respectively supplied to the gate terminals of the transistors 231c and 232c.

In addition, in a case where the power supply of the differential amplifier 221 is set to a low voltage, when being enabled, the gate selector 270c level-shifts ranges from the minimum voltage of 0 V to the maximum voltage of 3.3 V of the signals Gt1 and Gt2 into the third range and supplies the sifted signals to the gate terminals of the transistors 231c and 232c.

In the same manner, when being enabled, the gate selector 270d level-shifts the range from the minimum voltage to the maximum voltage of the signal Gt1 into the fourth range from the voltage $V_C$ to the voltage $V_D$, supplies the shifted signal to the gate terminal of the transistor 231d, level-shifts a range from the minimum voltage to the maximum voltage of the signal Gt2 into the fourth range, and supplies the shifted signal to the gate terminal of the transistor 232d. For this reasons, while not illustrated in particular, the gate selector 270d is configured to use, for example, the voltages $V_D$ and $V_C$ as power supplies.

If description is made to be limited to the gate selector 270d, when being enabled, 31.5 V is added to the signals Gt1 and Gt2 and the signals are respectively supplied to the gate terminals of the transistors 231d and 232d.

In addition, in a case where the power supply of the differential amplifier 221 is set to a low voltage, when being enabled, the gate selector 270d level-shifts ranges from the minimum voltage of 0 V to the maximum voltage of 3.3 V of the signals Gt1 and Gt2 into the fourth range and supplies the sifted signals to gate terminals of the transistors 231d and 232d.

When the select signals which are supplied to the input terminals Enb are disabled to an L level, the gate selectors 270a, 270b, 270c, and 270d output signals which respectively turn off two transistors corresponding thereto. That is, if being disabled, the gate selectors 270a, 270b, 270c, and 270d forcibly changes the signal Gt1 to an H level, and forcibly changes the signal Gt2 to an L level.

Here, the H level and the L level are respectively a high side voltage and a low side voltage of the power supply voltages of each of the gate selectors 270a, 270b, 270c, and 270d. For example, the gate selector 270b uses the voltage $V_B$ and the voltage $V_A$ as a power supply voltage thereof, and thus, the voltage $V_B$ on a high side is an H level, and a voltage $V_A$ on a low side is an L level.

The node N2 is fed back to the positive input terminal (+) of the differential amplifier 221 through the resistance element R1. In this example, for the sake of convenience, a voltage of the node N2 is referred to as Out1 and the positive input terminal (+) of the differential amplifier 221 is referred to as the node N3, and a voltage of the node N3 is referred to as Out2.

The node N3 is coupled to the ground Gnd through the resistance element R2. For this reason, the voltage Out2 of the node N3 is obtained by dividing a voltage of the voltage Out by a ratio which is defined by resistance values of the resistance elements R1 and R2, that is, R2/(R1+R2). In the present embodiment, a drop ratio is set to 1/10. In other words, the voltage Out2 is in a relationship of 1/10 of the voltage Out.

The node N2 is pulled up to the voltage $V_D$ through the resistance element Ru. In addition, it can also be said that the node N2 is pulled down through the resistance elements R1 and R2.

The capacitor C0 is provided for preventing abnormal oscillation, one terminal thereof is coupled to the node N2, and the other terminal thereof is coupled to a constant potential, for example, the ground Gnd.

Diodes d1 and d2 of each pair of transistors are used for blocking reverse currents. A forward direction of the diode d1 is a direction toward the node N2 from the drain terminals of the transistors 231a, 231b, and 231c, and a forward direction of the diode d2 is a direction toward the drain terminals of the transistors 231b, 231c, and 231d from the node N2.

The voltage Out of the node N2 is not higher than the voltage $V_D$, and thus, it is not necessary to consider a reverse current. For this reason, the diode d1 is not provided for the transistor 231d. In the same manner, the voltage Out of the node N2 is not lower than the ground Gnd of zero volts, and thus, the diode d2 is not provided for the transistor 232a.

An operation of the drive circuit 120a will be described.

Figure 12:
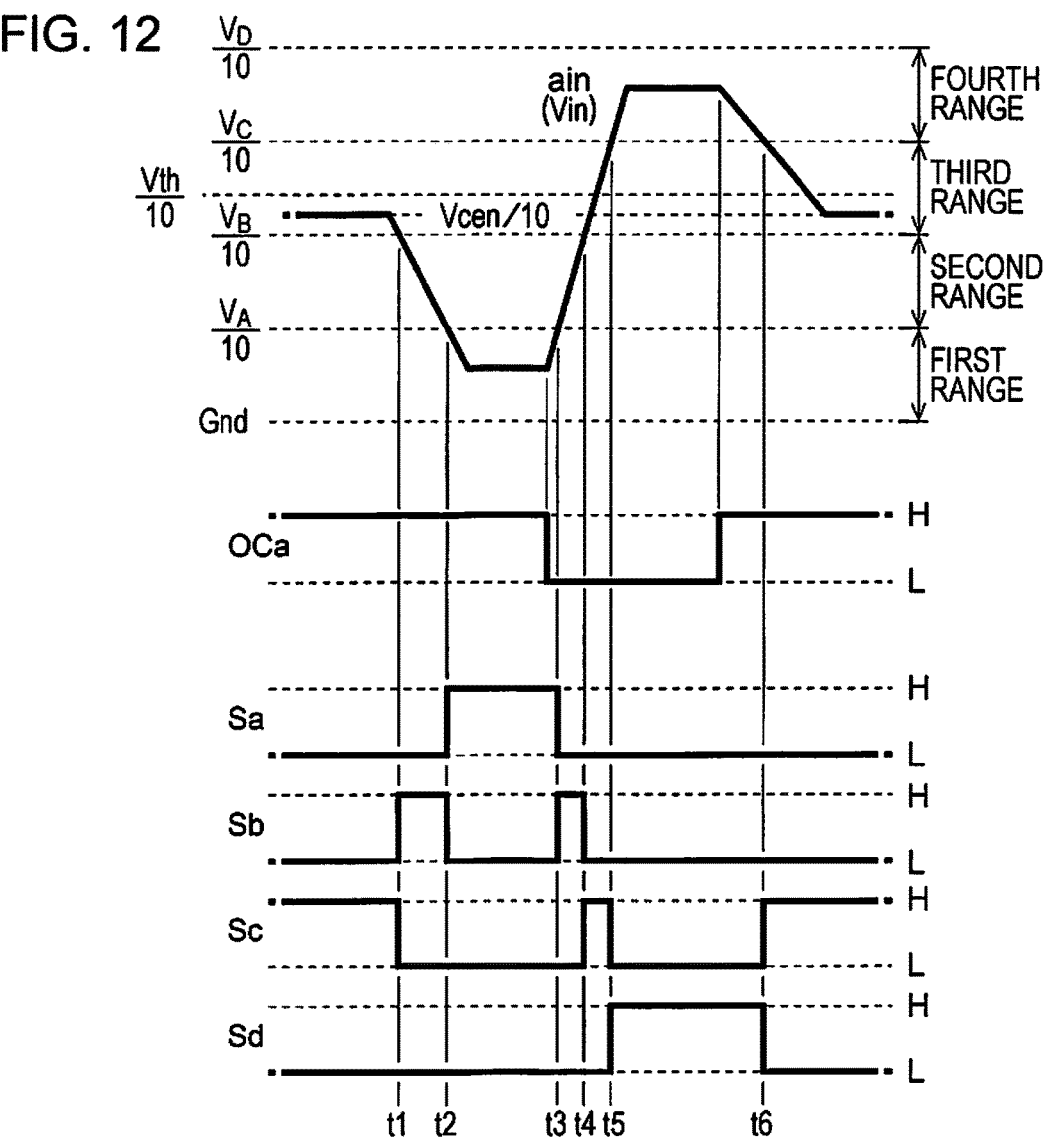
FIG. 12 is a diagram illustrating the operation of the drive circuit.

FIG. 12 is a diagram illustrating the operation of the drive circuit 120a. As described above, a waveform of the signal ain is different from a waveform of the drive signal COM-A, and the voltage Vin of the signal ain is in a relationship of 1/10 of the voltage Out1 of the drive signal COM-A.

For this reason, in a case where the first range to the fourth range which are defined by the voltages $V_A$, $V_B$, $V_C$, and $V_D$ are converted into a voltage range of the signal ain, the ranges are defined by the voltages $V_A/10$, $V_B/10$, $V_C/10$, and $V_D/10$. In detail, in the signal ain, a range higher than or equal to 0 V and lower than $V_A/10$ (=1.05 V) corresponds to the first range, a range higher than or equal to $V_A/10$ and lower than $V_B/10$ (=2.10 V) corresponds to the second range, a range higher than or equal to $V_B/10$ and lower than $V_C/10$ (=3.15 V) corresponds to the third range, and a range higher than or equal to $V_C/10$ and lower than $V_D/10$ (=4.20 V) corresponds to the fourth range.

First, in a case where the voltage Vin is discriminated from the data dA to be in the third range during a period prior to timing t1, the selector 280 sets only the select signal Sc to an H level, and sets the other select signals Sa, Sb, and Sd to an L level. For this reasons, the gate selector 270c is enabled, and the other gate selectors 270a, 270b, and 270d are disabled. Hence, in this case, the transistors 231c and 232c output the drive signal COM-A by using the voltages $V_C$ and $V_B$ as power supply voltages.

Next, when the voltage Vin is in the second range during a period from timing t1 to timing t2, the selector 280 sets only the select signal Sb to an H level, and sets the other select signals Sa, Sc, and Sd to an L level, and thereby the gate selector 270b is enabled, and the other gate selectors 270a, 270c, and 270d are disabled. Hence, in this case, the transistors 231b and 232b output the drive signal COM-A by using the voltages $V_B$ and $V_A$ as power supply voltages.

When the voltage Vin is in the first range during a period from timing t2 to timing t3, the selector 280 sets only the select signal Sa to an H level, and as a result, only the gate selector 270a is enabled, and thereby the transistors 231a and 232a output the drive signal COM-A by using the voltages $V_A$ and the ground Gnd as power supply voltages.

The subsequent operations will be briefly described. Since only the gate selector 270b is enabled during a period from timing t3 to timing t4, the transistors 231b and 232b use the voltages $V_B$ and $V_A$ as power supply voltages. Since only the gate selector 270c is enabled during a period from timing t4 to timing t5, the transistors 231c and 232c use the voltages $V_C$ and $V_B$ as power supply voltages. Since only the gate selector 270d is enabled during a period from timing t5 to timing t6, the transistors 231d and 232d use the voltages $V_D$ and $V_C$ as power supply voltages. Since only the gate selector 270c is enabled from timing t6, the transistors 231c and 232c use the voltages $V_C$ and $V_B$ as power supply voltages. By doing so, each transistor outputs the drive signal COM-A.

Meanwhile, the voltage Out2 of the node N3 is 1/10 of the voltage Out, and thus, in order to obtain the difference voltage, both scales are aligned.

In the drive circuit 120a, any one of the gate selectors 270a, 270b, 270c, and 270d is enabled in accordance with the voltage Vin of the signal ain, and thereby, an operation in which the voltage Out2 that is obtained by dropping the voltage Out by 1/10 follows the voltage Vin, in other words, an operation in which the voltage Out is amplified by 10 times the voltage Vin is performed by the pair of transistors corresponding to the enabled gate selector.

For example, in a case where the voltage Vin corresponds to the first range, the gate selector 270a is enabled, and thereby, the operation in which the voltage Out2 follows the voltage Vin is performed by the transistors 231a and 232a. In the same manner, in a case where the voltage Vin corresponds to the second range, the gate selector 270b is enabled, and thereby, the operation in which the voltage Out2 follows the voltage yin is performed by the transistors 231b and 232b. In a case where the voltage Vin corresponds to the third range, the gate selector 270c is enabled, and thereby, the operation in which the voltage Out2 follows the voltage Vin is performed by the transistors 231c and 232c. In a case where the voltage Vin corresponds to the fourth range, the gate selector 270d is enabled, and thereby, the operation in which the voltage Out2 follows the voltage Vin is performed by the transistors 231d and 232d.

There is a case where the voltage Vin of the signal ain crosses (transition) adjacent regions in the first range to the fourth range. For example, referring to FIG. 12, transition of the voltage Vin from the third range to the second range is performed at timing t1. If the voltage Vin is in the third range, the gate selector 270c is enabled, and thereby, the voltage Out is controlled to be 10 times the voltage Vin by the transistors 231c and 232c. When transition of the voltage yin from the third range to the second range is performed at the timing t1, the gate selector 270c is disabled, the gate selector 270b is enabled, and thereby, the voltage Out2 is controlled to follow the voltage Vin by the transistors 231b and 232b.

Here, a case where the transition of the voltage Vin from the third range to the second range is performed is described as an example, but other cases are the same, and for example, if transition from the second range to the first range is performed, the gate selector 270b is disabled, the gate selector 270a is enabled, and thereby, the subsequent voltage Out2 is controlled to follow the voltage Vin by the transistors 231a and 232a.

Next, control of making the voltage Out2 follow the voltage Vin using any one pair of transistors will be described.

In the drive circuit 120a, any one of the gate selectors 270a, 270b, 270c, and 270d is enabled in accordance with the voltage Vin of the signal ain, but the enabled gate selector operates in any one of the following four cases, if the drive signal has a trapezoidal waveform.

That is, there are a case where (first case) the voltage Vout of the signal ain decreases, a case where (second case) the voltage Vout of the signal ain is constant at a voltage lower than the threshold value Vth, a case where (third case) the voltage Vout of the signal ain increases, and a case where (fourth case) the voltage Vout of the signal ain is constant at a voltage higher than or equal to the threshold value Vth.

If description is made with reference to the waveform of the drive signal COM-A illustrated in FIG. 12, the gate selector 270a has the first case, the second case, and the third case and does not have the fourth case, the gate selector 270b has the first case and the third case and does not have the second case and the fourth case, the gate selector 270c has the first case, the second case, and the third case and does not have the fourth case, and the gate selector 270d has the first case, the third case, and the fourth case and does not have the second case.

Next, an operation of a pair of transistors corresponding to the enabled gate selector will be described. Here, the enabled gate selector is not specified, and is described in a general sense. For this reasons, in the pair of transistors corresponding to the enabled gate selector, a reference numeral of a transistor on a high side is set to 231, and a reference numeral of a transistor on a low side is set to 232.

First, the first case where the voltage of the signal ain (COM-A) decreases will be described.

In the first case, the signal OCa is in an H level, and thereby, the selector 223 selects an H level as the signal Gt1 and selects a signal which is output from the differential amplifier 221 as the signal Gt2.

In addition, in the first case, the voltage Vin of the signal ain decreases prior to the voltage Out2 of the node N3. In other words, the voltage Out2 is higher than or equal to the voltage Vin. For this reasons, a voltage of the output signal of the differential amplifier 221 which is selected as the signal Gt2 increases in accordance with a difference voltage between both voltages, and swings approximately to an H level. If the signal Gt2 goes to an H level, the N-channel transistor 232 is turned on, and thereby, the voltage Out2 decreases. The voltage Out2 of the node N3 is 1/10 of the voltage Out1 of the node N2, but actually, is slowly decreased by the capacitor C0, the piezoelectric element Pzt with capacitance, or the like, without being immediately decreased to a low side voltage of the power supply.

If the voltage Out2 decreases to be lower than the voltage Vin, the signal Gt2 goes to an L level and the transistor 232 is turned off, but since the voltage Vin decreases, the voltage Out2 increases to be higher than or equal to the voltage Vin again. For this reasons, the signal Gt2 goes to an H level, and the transistor 232 is turned on again.

In the first case, the signal Gt2 is alternately switched to an H level and an L level, and thereby, the transistor 232 performs a repetitive operation of turn-on and turn-off, that is, a switching operation. The control of making the voltage Out2 follow the voltage Vin (such that the voltage Out1 is 10 times the voltage Vin) is performed by the switching operation.

In the first case, the selector 223 selects an H level as the signal Gt1, and thereby, the P-channel transistor 231 is turned off.

Next, the second case where the signal ain (COM-A) is constant at a voltage lower than the threshold value Vth will be described.

In the second case, the signal OCa is in an H level, and thereby, the selector 223 selects an H level as the signal Gt1 and selects the signal which is output from the differential amplifier 221 as the signal Gt2, in the same manner as in the first case.

In the second case, if the voltage Out2 is higher than the voltage Vin, a voltage of the signal Gt2 also increases, and thereby, resistance between a source and a drain of the transistor 232 decreases and the voltage Out2 decreases. Meanwhile, if the voltage Out2 is lower than the voltage Vin, the voltage of the signal Gt2 also decreases, and thereby, resistance between a source and a drain of the transistor 232 increases and the voltage Out2 increases.

Hence, in the second case, the voltage Out2 keeps a balance between a direction in which the voltage Out2 increases and a direction in which the voltage Out2 decreases, that is, balances to coincide with the voltage Vin which is constant. At this time, the signal Gt2 balances to a voltage in which the voltage Out2 becomes the voltage Vin, and thereby, the transistor 232 performs a linear operation.

Subsequently, the third case where the voltage of the signal ain (COM-A) increases will be described.

In the third case, the signal OCa is in an L level, and thereby, the selector 223 selects a signal which is output from the differential amplifier 221 as the signal Gt1 and selects an L level as the signal Gt2.

In addition, in the third case, the voltage Vin of the signal ain increases prior to the voltage Out2 of the node N3. In other words, the voltage Out2 is lower than the voltage Vin. For this reasons, the voltage of the output signal of the differential amplifier 221 which is selected as the signal Gt1 decreases in accordance with a difference voltage between both voltages, and swings approximately to an L level. If the signal Gt1 goes to an L level, the P-channel transistor 231 is turned on, and thereby, the voltage Out2 increases. Actually, the voltage Out2 is slowly increased by the capacitor C0, the piezoelectric element Pzt with capacitance, or the like, without being immediately increased to a high side voltage of the power supply.

If the voltage Out2 increases to be higher than or equal to the voltage Vin, the signal Gt2 goes to an H level and the transistor 231 is turned off, but since the voltage Vin increases, the voltage Out2 increases to be lower than the voltage Vin again. For this reasons, the signal Gt2 goes to an L level, and the transistor 231 is turned on again.

In the third case, the signal Gt1 is alternately switched to an H level and an L level, and thereby, the transistor 231 performs a switching operation. The control of making the voltage Out2 follow the voltage Vin is performed by the switching operation.

In the third case, the selector 223 selects an L level as the signal Gt2, and thereby, the N-channel transistor 232 is turned off.

The fourth case where the signal ain (COM-A) is constant at a voltage higher than or equal to the threshold value Vth will be described.

In the fourth case, the signal OCa is in an L level, and thereby, the selector 223 selects the signal which is output from the differential amplifier 221 as the signal Gt1 and selects an L level as the signal Gt2, in the same manner as in the third case.

In the fourth case, if the voltage Out2 is lower than the voltage Vin, a voltage of the signal Gt1 also decreases, and thereby, resistance between a source and a drain of the transistor 231 decreases and the voltage Out2 increases. Meanwhile, if the voltage Out2 is higher than the voltage Vin, the voltage of the signal Gt1 also increases, and thereby, resistance between a source and a drain of the transistor 231 increases and the voltage Out2 decreases.

Hence, in the fourth case, the voltage Out2 keeps a balance between a direction in which the voltage Out2 increases and a direction in which the voltage Out2 decreases, that is, balances to coincide with the voltage Vin which is constant. At this time, the signal Gt1 balances to a voltage in which the voltage Out2 becomes the voltage Vin, and thereby, the transistor 231 performs a linear operation.

Any one of the gate selectors 270a, 270b, 270c, and 270d is enabled by the selector 280 in accordance with the voltage Vin of the signal ain, and a pair of transistors corresponding to the enabled gate selector operates in any one of the first to the fourth case.

Here, pull-up and pull-down of the node N2 will be described.

Referring to the aforementioned cases, a case where pull-up is required is the second case, that is, a case where the transistor 232 on a low side performs a linear operation. In this case, the transistor 231 on a high side is turned off, and thereby, it is necessary to pull up the node N2 toward a high side so as to increase the voltage Out of the node N2 by using the transistor 232 on a low side.

Meanwhile, referring to the aforementioned cases, a case where pull-down is required is the fourth case, that is, a case where the transistor 231 on a high side performs a linear operation. In this case, the transistor 232 on a low side is turned off, and thereby, it is necessary to pull down the node N2 toward a low side so as to decrease the voltage Out of the node N2 by using the transistor 231 on a high side.

Here, the drive circuit 120a which outputs the drive signal COM-A is described as an example, but the drive circuit 120b which outputs the drive signal COM-B also outputs the drive signal COM-B of the voltage Vout which follows the voltage of the signal bin.

Each of the drive circuits 120a and 120b includes four pairs of transistors, but the pair of transistors to be enabled is only one of the four pairs all the time, and the other pairs of transistors are disabled. In addition, in the pair of transistors which is enabled, only one of the transistor on a high side and a transistor on a low side performs a switching operation. For this reasons, according to the present embodiment, it is possible to reduce power which is consumed by the switching operation, compared with D-class amplification in which switching is continuously performed.

In addition, the D-class amplification requires a low pass filter (LPF) which demodulates a switching signal, particularly, an inductor such as a coil, but the drive circuits 120a and 120b does not require the LPF. For this reasons, according to the present embodiment, it is possible to reduce power which is consumed by the LPF, and in addition, to simplify and miniaturize a circuit.

The drive signal COM-A (COM-B) is not limited to a trapezoidal waveform, and may be a waveform with a continuous slope, such as a sine wave. In a case where such a waveform is output, if a change of the voltage Vout (voltage Vin of the signal ain) of the drive signal COM-A is relatively large, for example, if a voltage change per unit time is higher than or equal to a predetermined value, one of the transistors 231 and 232 may perform a switching operation, and if a voltage change per unit time is lower than the predetermined value, one of the transistors 231 and 232 may perform a linear operation.

In this example, the original drive signal is amplified to generate the drive signals COM-A and COM-B, the print period Ta is divided and any one of drive signals is selected (or no signal is selected) during periods T1 and T2, the selected drive signal is applied to one terminal of the piezoelectric element Pzt, and thereby, four gradations are represented during the print period Ta, but more gradations can be represented by preparing more drive signals. For example, if a configuration is provided in which eight types of drive signals are generated, it is possible to significantly increase the number of representable gradations during the print period Ta.

Meanwhile, in order to generate the eight types of drive signals, eight drive circuits are required. For this reasons, an area of the main substrate 100 needs to be increased, and it is expected that miniaturization is difficult to be achieved.

Hence, next, a technology of miniaturizing the periphery of a drive circuit will be described.

The drive circuit has the same configuration as the drive circuit 120a illustrated in FIG. 10, but in this example, eight drive circuits are provided, and thus, description will be made hereinafter without symbols of the drive circuits.

In a case where eight drive circuits are provided, which parts of the circuits are to be integrated in common is important in terms of miniaturization. Meanwhile, a package at the time when a semiconductor integrated circuit is molded with resin has a rectangular shape in general in a planar view.

For this reasons, it is preferable that, the integrated circuit have a configuration in which four sides are made to correspond to four drive circuits, and a terminal which outputs a control signal corresponding to one drive circuit and terminals for receiving four voltages are provided. Meanwhile, it is preferable that a diode, a resistance element, and the like be externally attached in terms of a breakdown voltage of a transistor itself.

Hence, in the present example, one integrated circuit has a configuration in which four sets of the differential amplifier 221, the selector 223, the gate selectors 270a, 270b, 270c, and 270d, and the selector 280 are integrated.

In a case where eight drive circuits are provided, two integrated circuits described above are required. Mounting two integrated circuits on a main substrate is disadvantageous for miniaturization, and thus, in the present example, a configuration is provided in which a first integrated circuit and a second integrated circuit are respectively mounted on both surfaces.

FIG. 13 is a view when disposition of lead is viewed from a surface (front surface) in particular in the integrated circuit assumed in such a way. Here, the front surface indicates a surface opposite to a mounting surface, when the mounting surface which is mounted on a substrate is referred to as a rear surface.

An integrated circuit 12a illustrated in FIG. 13 is a semiconductor integrated circuit in which four sets of, for example, the differential amplifier 221, the selector 223, the gate selectors 270a, 270b, 270c, and 270d, and the selector 280 in the drive circuit are integrated as described above. Appearance of the integrated circuit is a rectangular shape in a planar view, and the integrated circuit is a so-called quad flat package (QFP) of a surface mount type in which a plurality of leads (coupling terminals) are provided on four sides.

Since gate signals (control signals) which control an operation of a pair of transistors are output by the differential amplifier 221, the selector 223, the gate selectors 270*a*, 270*b*, 270*c*, and 270*d*, and the selector 280 in the integrated circuit 12*a*, the integrated circuit 12*a* functions as a first control circuit.

In FIG. 13, a black circle mark on a left upper end portion of the integrated circuit 12*a* is used as a reference point, and a lead 123*g* which is coupled to the ground Gnd, a lead 123*a* which receives the voltage $V_A$, a lead 123*b* which receives the voltage $V_B$, a lead 123*c* which receives the voltage $V_C$, and a lead 123*d* which receives the voltage $V_D$ are sequentially arranged from the reference point on an upper side.

The reason why the integrated circuit 12*a* receives the ground Gnd and the voltages $V_A$, $V_B$, $V_C$, and $V_D$ is that the voltages are used as power supply voltages of the gate selectors 270*a*, 270*b*, 270*c*, and 270*d* as described above.

In addition, the lead 123*g* which is coupled to the ground Gnd, the lead 123*a* which receives the voltage $V_A$, the lead 123*b* which receives the voltage $V_B$, the lead 123*c* which receives the voltage $V_C$, and the lead 123*d* which receives the voltage $V_D$ are sequentially arranged from the reference point on a left side. For example, when viewed from a left side, leads on a lower side are arranged in a reverse order with respect to leads on the upper side facing the lower side. For example, when viewed from a right side, leads on the right side are arranged in a reverse order with respect to the leads on the left side facing the right side.

For this reasons, the leads which are arranged on each side of the integrated circuit 12*a* are symmetrical with respect to a diagonal line 121 passing through the black circle mark in view of a voltage which is received.

Leads of the integrated circuit 12*a* include, for example, leads which output gate signals of each transistor, in addition to the leads coupled to the ground Gnd and the leads receiving the voltages $V_A$, $V_B$, $V_C$, and $V_D$, but description thereof will be omitted for the sake of convenience.

In addition, a DAC may be embedded in a previous stage of the differential amplifier 221 in the integrated circuit 12*a*.

FIG. 14 is a diagram when disposition of the leads of the integrated circuit 12*a* are viewed from the rear surface, and is a diagram in a case where the front surface is reversed such that the upper side and the lower side of FIG. 13 are aligned. No description will be required in particular.

Figure 15:
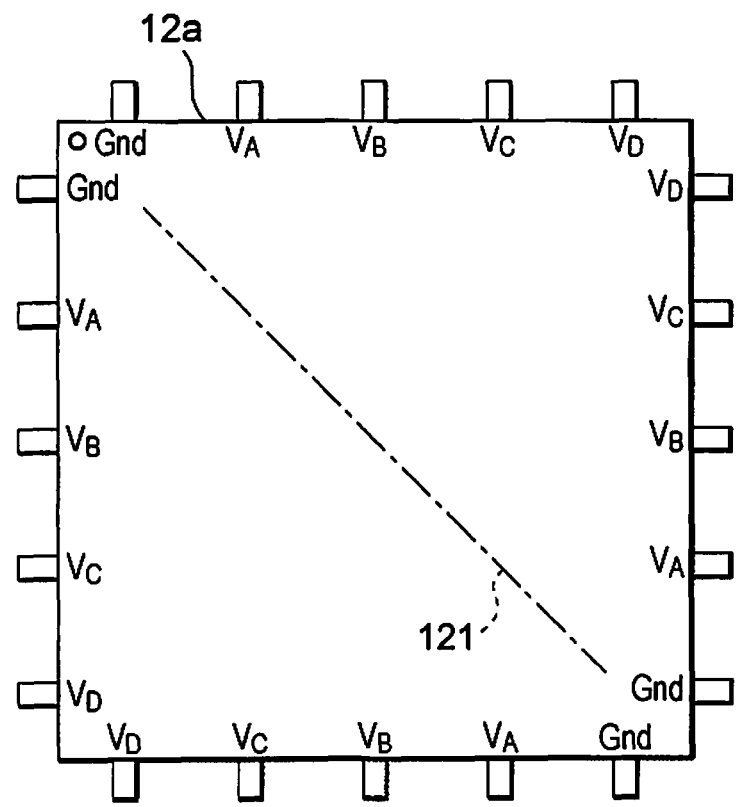
FIG. 15 is another plan view illustrating the rear surface of the integrated circuit.

FIG. 15 is a diagram in a case where the rear surface illustrated in FIG. 14 is rotated by 90 degrees clockwise or counterclockwise.

The integrated circuit 12*a* corresponds to four drive circuits, and thus, the same two integrated circuits are required in this example. That is, another integrated circuit with the same function is required in addition to the integrated circuit 12*a*.

Here, in order to distinguish the two integrated circuits, a symbol of another integrated circuit is referred to as 12*b*. The integrated circuit 12*b* outputs gate signals which control an operation of a pair of transistors by using the differential amplifier 221, the selector 223, the gate selectors 270*a*, 270*b*, 270*c*, and 270*d*, and the selector 280, and thus, the integrated circuit 12*b* functions as a first control circuit.

Figure 16:
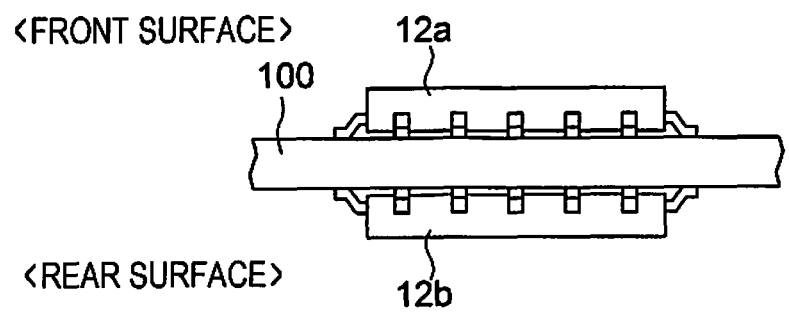
FIG. 16 is a view illustrating a mounting state of the drive circuit on both surfaces.

FIG. 16 is a diagram illustrating a mounting state on both surfaces of the integrated circuits 12*a* and 12*b*.

As illustrated in FIG. 16, the integrated circuit 12*a* is mounted on a front surface and the integrated circuit 12*b* is mounted on a rear surface, in the main substrate 100. When viewed in a planar view, the integrated circuit 12*a* and the integrated circuit 12*b* overlap each other in FIG. 16 (not illustrated).

Voltages which are received by leads on each side of one integrated circuit are symmetrical with respect to a diagonal line 121, and thus, if the integrated circuit 12*b* is mounted in a state of being flipped over the integrated circuit 12*a* and rotated by 90 degrees (may be rotated clockwise or counterclockwise), order of the ground Gnd of a ground level, the voltages $V_A$, $V_B$, $V_C$, and $V_D$ which are applied to the leads of the integrated circuits 12*a* and 12*b* is aligned over all the four sides.

Meanwhile, a pair of transistors and diodes d1 and d2 other than the differential amplifier 221, the selector 223, the gate selectors 270*a*, 270*b*, 270*c*, and 270*d*, and the selector 280 in one set of drive circuits, are disposed on four sides of the integrated circuit 12*a* as follows.

Figure 17:
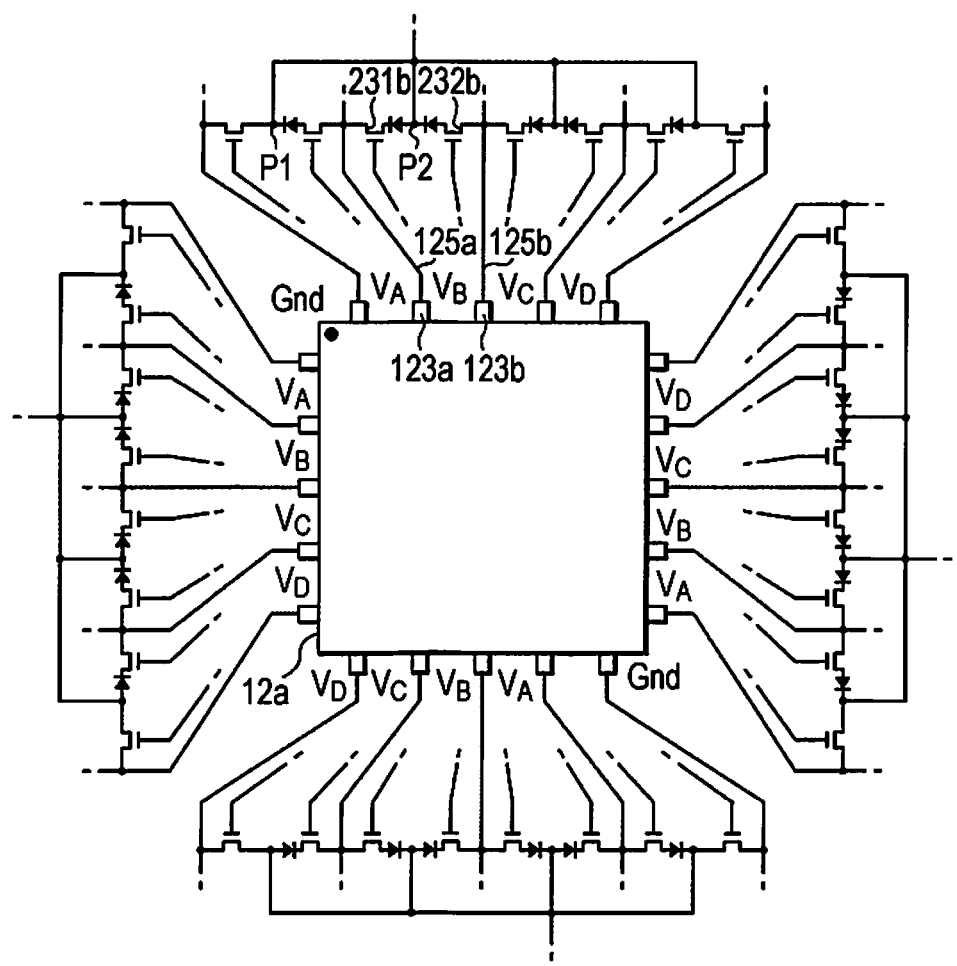
FIG. 17 is a plan view illustrating a mounting state of the integrated circuit and a peripheral circuit on the front surface.

FIG. 17 is a plan view illustrating where the pair of transistors and the diodes d1 and d2 are disposed in the integrated circuit 12*a* which is mounted on the front surface of the main substrate 100 among the integrated circuits 12*a* and 12*b*.

As illustrated in FIG. 17, four sets of the pair of transistors and the diodes d1 and d2 are respectively provided in a straight line shape along each of the four sides of the integrated circuit 12*a*, and each set of the pairs of transistors and the diodes d1 and d2 is provided between wires of power supply voltages extending in a radial shape from leads on each side.

While partial symbols are omitted in FIG. 17, for example, a transistor 231*d*, the diode d2, transistors 232*d* and 231*c*, the diodes d1 and d2, transistors 232*c* and 231*b*, the diodes d1 and d2, transistors 232*b* and 231*a*, the diode d1, and a transistor 232*a* are sequentially provided from a left side (high power supply voltage) in a straight line shape on an upper side of the integrated circuit 12*a* (refer to FIG. 10 with regard to symbols of the transistors and the diodes). Among these, for example, the transistors 231*b* and 232*b* which uses, for example, voltages $V_B$ and $V_A$ as the power supply voltages are provided between a wire 125*b* extending from a lead 123*b* on an upper side in a radial shape, and a wire 125*a* extending from a lead 123*a* in a radial shape.

Figure 18:
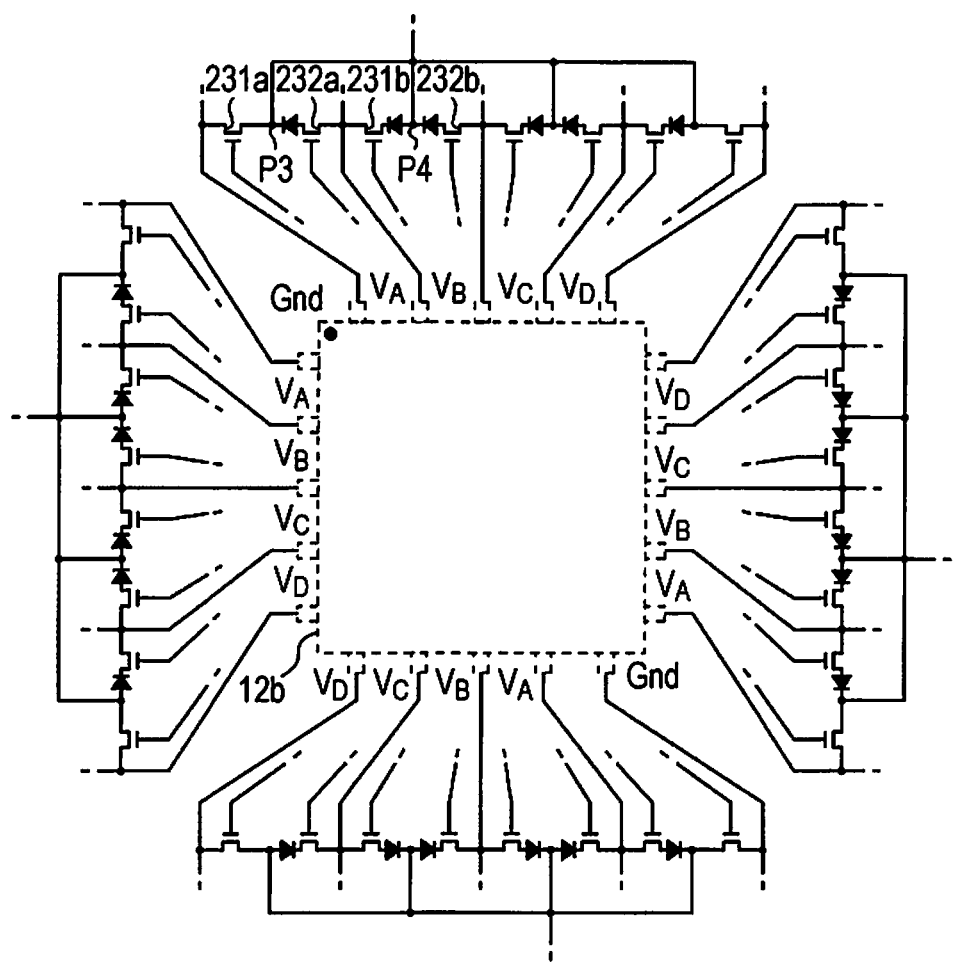
FIG. 18 is a perspective view illustrating a mounting state of the integrated circuit and the peripheral circuit on the rear surface.

FIG. 18 is a view illustrating where the pair of transistors and the diodes d1 and d2 are disposed in the integrated circuit 12*b* which is mounted on the rear surface of the main substrate 100 among the integrated circuits 12*a* and 12*b* by viewing from the same direction as in FIG. 17.

As illustrated in FIG. 18, in a case where the integrated circuit 12*b*, the pair of transistors, and the diodes d1 and d2 which are mounted on the rear surface of the main substrate 100 are viewed from the same direction as in FIG. 17, the integrated circuit 12*b*, the pair of transistors, and the diodes d1 and d2 overlap the integrated circuit 12*a*, the pair of transistors, and the diodes d1 and d2 which are mounted on the front surface.

Furthermore, leads on each side of the integrated circuits 12*a* and 12*b* and wires extending from the leads overlap each other on the front surface and the rear surface of the main substrate 100 in a state where a relationship in which the same voltage is applied is retained.

In other words with regard to mounting on both surfaces of the main substrate 100, a distance between a coupling point P1 of the transistors 231*a* and 232*a* (first pair of transistors) which are mounted on the front surface and a coupling point P3 of the transistors 231*a* and 232*a* (third pair of transistors) which are mounted on the rear surface is shorter than a distance between the coupling point P1 and a coupling point P4 of the transistors 231*b* and 232*b* (fourth pair of transistors) which are mounted on the rear surface in a planar view. In addition, a distance between a coupling point P2 of the transistors 231*b* and 232*b* (second pair of transistors) which are mounted on the front surface and the coupling point P4 is shorter than a distance between the coupling point P2 and the coupling point P3 in a planar view.

In addition, when viewed in a planar view, an electrical distance between the integrated circuit 12*a* and the coupling point P1 is equal to the electrical distance between the integrated circuit 12*b* and the coupling point P3, and an electrical distance between the integrated circuit 12*a* and the coupling point P2 is equal to the electrical distance between the integrated circuit 12*b* and the fourth pair of transistors. For this reasons, an operation of a pair of transistors which use the same power supply voltage in drive circuits different from each other can be aligned.

Next, advantage of the present embodiment will be described in comparison with a comparative example.

Figure 22:
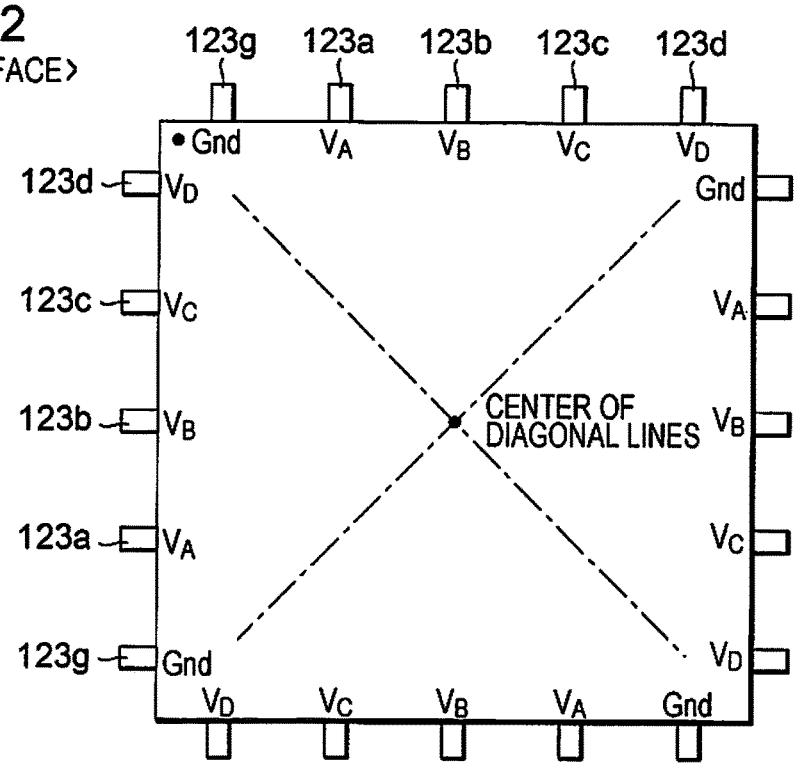
FIG. 22 is a plan view illustrating the front surface of the integrated circuit according to a comparative example.

FIG. 22 is a diagram when disposition of leads of an integrated circuit according to the comparative example is viewed from a front surface.

As illustrated in FIG. 22, in the integrated circuit according to the comparative example, the lead 123*g* which is coupled to the ground Gnd, the lead 123*a* which receives the voltage $V_A$, the lead 123*b* which receives the voltage $V_B$, the lead 123*c* which receives the voltage $V_C$, and the lead 123*d* which receives the voltage $V_D$ are sequentially arranged from the reference point on an upper side, and the voltages which are received by the leads on other sides are in a relationship in which the upper side is rotated by 90 degrees. For this reasons, the voltages which are received by the leads on each side of the integrated circuit according to the comparative example are point-symmetrical with respect to the center of a diagonal line which is used as reference.

Figure 23:
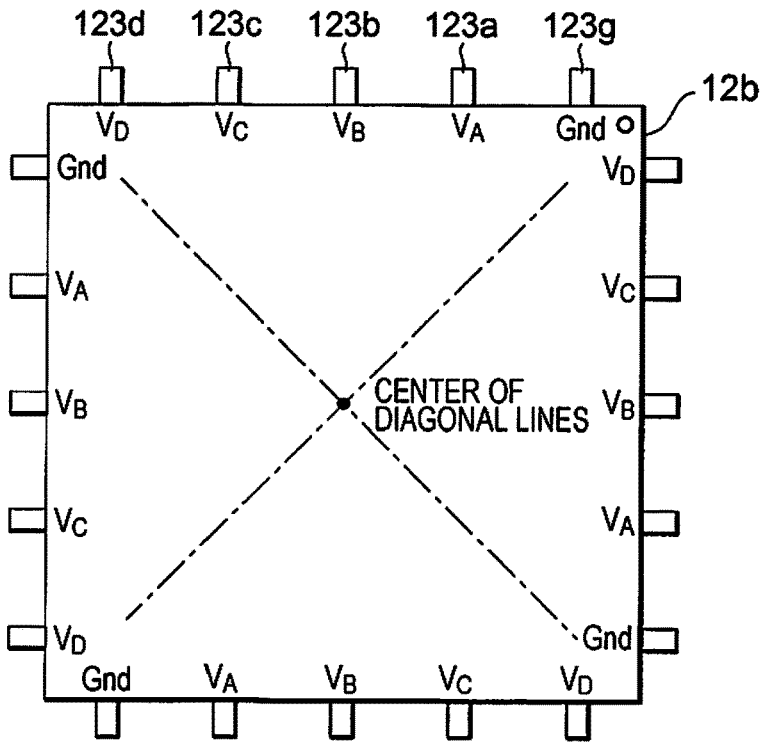
FIG. 23 is a plan view illustrating the rear surface of the integrated circuit according to the comparative example.

FIG. 23 is a diagram when disposition of the leads of the integrated circuit according to the comparative example are viewed the rear surface, and is a diagram in a case where the front surface is reversed such that the upper side and the lower side of FIG. 22 are aligned. The disposition of the leads of the integrated circuit according to the comparative example does not change even if the integrated circuit is rotated by 90 degrees, 180 degrees, or 270 degrees as illustrated in FIG. 24.

Figure 24:
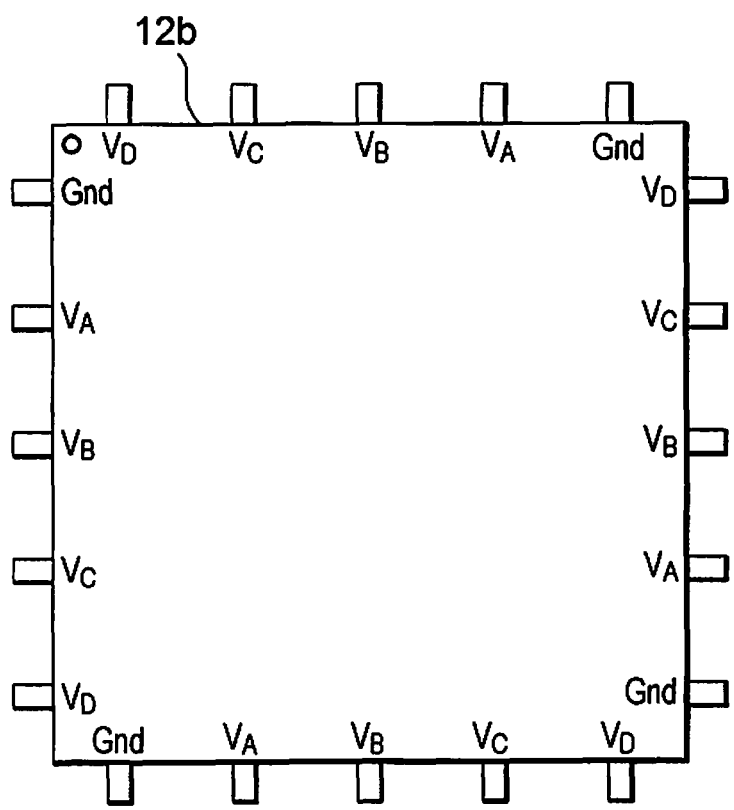
FIG. 24 is a plan view illustrating the rear surface of the integrated circuit according to the comparative example.
Figure 25:
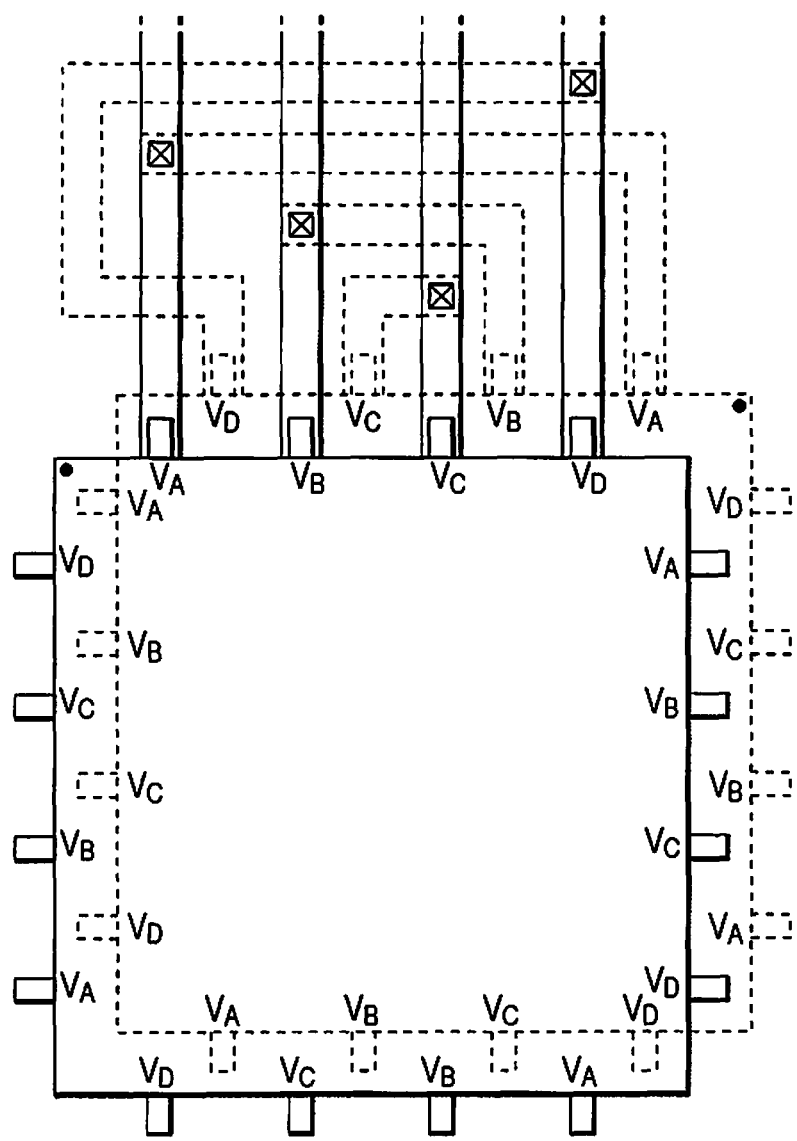
FIG. 25 is a plan view illustrating a mounting state of the integrated circuit on both surfaces according to the comparative example.

FIG. 24 is a diagram illustrating a state where the integrated circuits according to the comparative example are respectively mounted on both surfaces of the front surface and the rear surface of the main substrate. If the integrated circuit according to the comparative example is flipped over and mounted on the rear surface of the main substrate, the integrated circuit which is mounted on the rear surface is necessarily reversed with respect to the disposition of the leads of the integrated circuit which is mounted on the front surface, although being rotated.

For this reasons, in the integrated circuit which is mounted on the front surface and the integrated circuit which is mounted on the rear surface, for example, the wires formed on the rear surface among the wires which supply the voltages $V_A$, $V_B$, $V_C$, and $V_D$ to the leads of each side intersect the wires to which other voltages are applied on the front surface in a planar view, and are coupled to the wires to which the same voltages are applied on the same front surface through contact holes. For this reasons, the wires of the main substrate on which the integrated circuit according to the comparative example is mounted are complicated at a glance as illustrated in FIG. 24.

Hence, the integrated circuit according to the comparative example has problems in which not only the wires of the main substrate are complicated, but also a wide area is required, a line width cannot be sufficiently secured, and wire resistance increases.

In contrast to this, in the present embodiment, the wires formed on the rear surface do not intersect the wires to which other voltages are supplied on the front surface in a planar view, can be coupled to the wires to which the same voltages are applied on the front surface, and thus, it is possible to avoid the problems and to reduce the area of the main substrate or the like. Specifically, the wires of the power supply voltages formed on the front surface and the wires of the power supply voltages formed on the rear surface can be placed at the same position, and thus, it is easy to couple by a through-hole, and it is possible to reduce resistance of the wire. In addition, as the resistance of the wire of the power supply voltage is reduced, a stable operation of the pair of transistors and suppression of noise can be expected.

The pair of transistors and diodes which are externally attached to the integrated circuit can be efficiently disposed in the drive circuit, and thus, it is possible to reduce the mounting area of the components. In addition, output destinations of other drive signals are toward four directions, and thus, occurrence of mutual interference is suppressed.

Eight drive circuits are used in the description, and thereby, a configuration is provided in which the voltages $V_A$, $V_B$, $V_C$, and $V_D$ are received by the leads arranged on each side of the two integrated circuits 12*a* and 12*b*, but for example, in a case where two drive circuits are used, a configuration may be provided in which the voltages $V_A$, $V_B$, $V_C$, and $V_D$ are respectively received by the leads arranged on one side on the same side of the two integrated circuits 12*a* and 12*b*.

In addition, for example, in a case where two drive circuits are used, a configuration may be provided in which the voltages are respectively received by the leads arranged on two sides adjacent to each other in one integrated circuit 12*a*.

In the same manner, for example, in a case where the two drive circuits are used, a configuration may be provided in which the voltages are respectively received by the leads arranged on two sides facing each other in one integrated circuit 12*a*.

In the invention, the drive circuits are not limited to the drive circuits 120*a* and 120*b* illustrated in FIG. 4 and FIG. 10, and the invention can be applied to a drive circuit which amplifies an input signal by using a plurality of voltages and drives a capacitance load such as the piezoelectric element Pzt.

Figure 19:
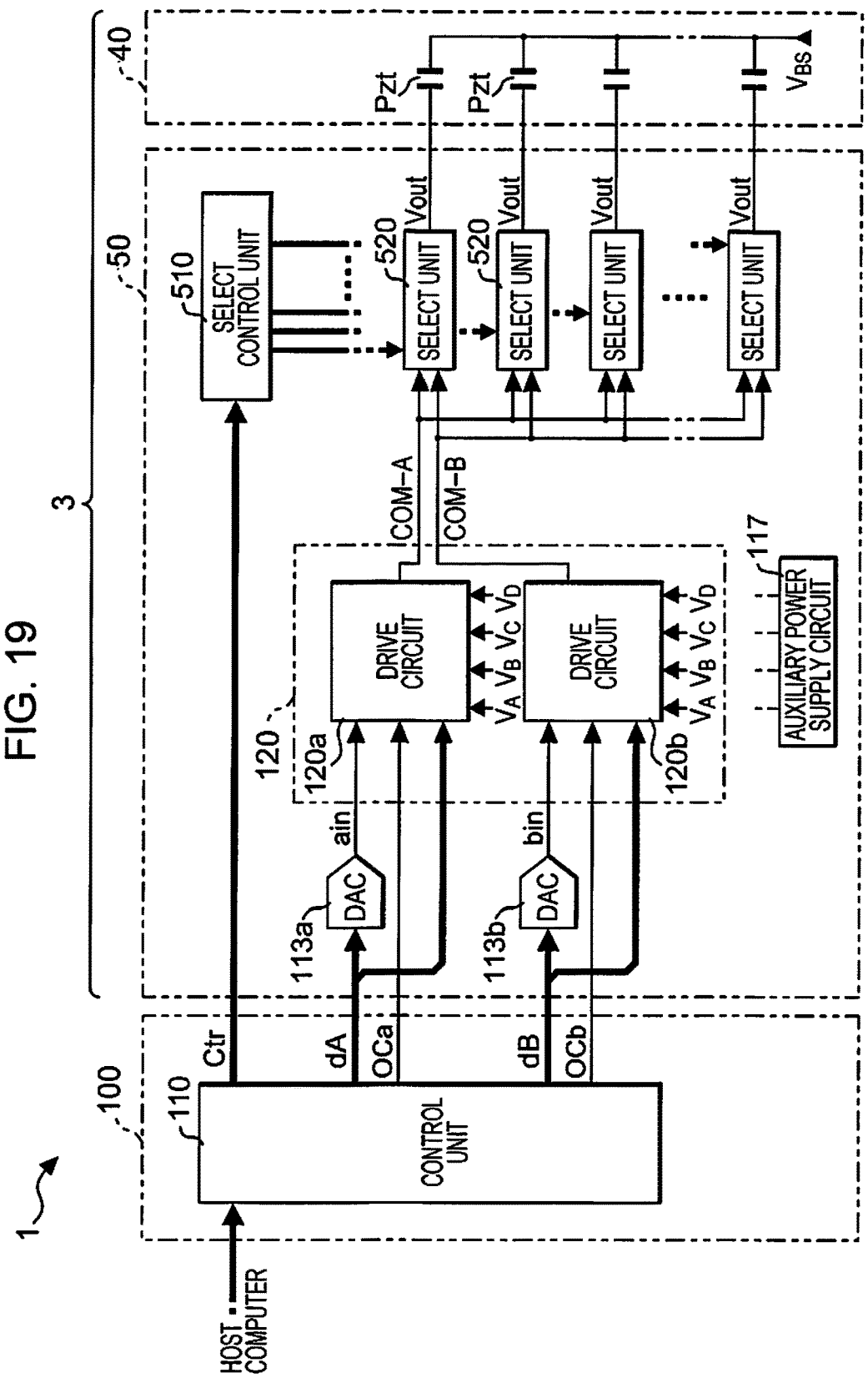
FIG. 19 is a diagram illustrating the printing apparatus according to another example (the first of those).

FIG. 19 is a block diagram illustrating an electrical configuration of a printing apparatus according to another example (the first of those).

A difference between the printing apparatus illustrated in FIG. 19 and the printing apparatus illustrated in FIG. 4 is that the DACs 113*a* and 113*b*, the auxiliary power supply circuit 117, and the drive circuit 120 are moved onto a side of the COF 50 of the head unit 3.

According to the configuration, a signal which is supplied from the main substrate 100 to the head unit 3 through the flexible flat cable 190 (omitted in FIG. 19) can be used as a digital signal with a small amplitude.

The DACs 113*a* and 113*b*, the auxiliary power supply circuit 117, and the drive circuit 120 may be integrated into an integrated circuit different from the integrated circuit with functions of the select control unit 510 and the select unit 520, and may be integrated into the same integrated circuit.

Figure 20:
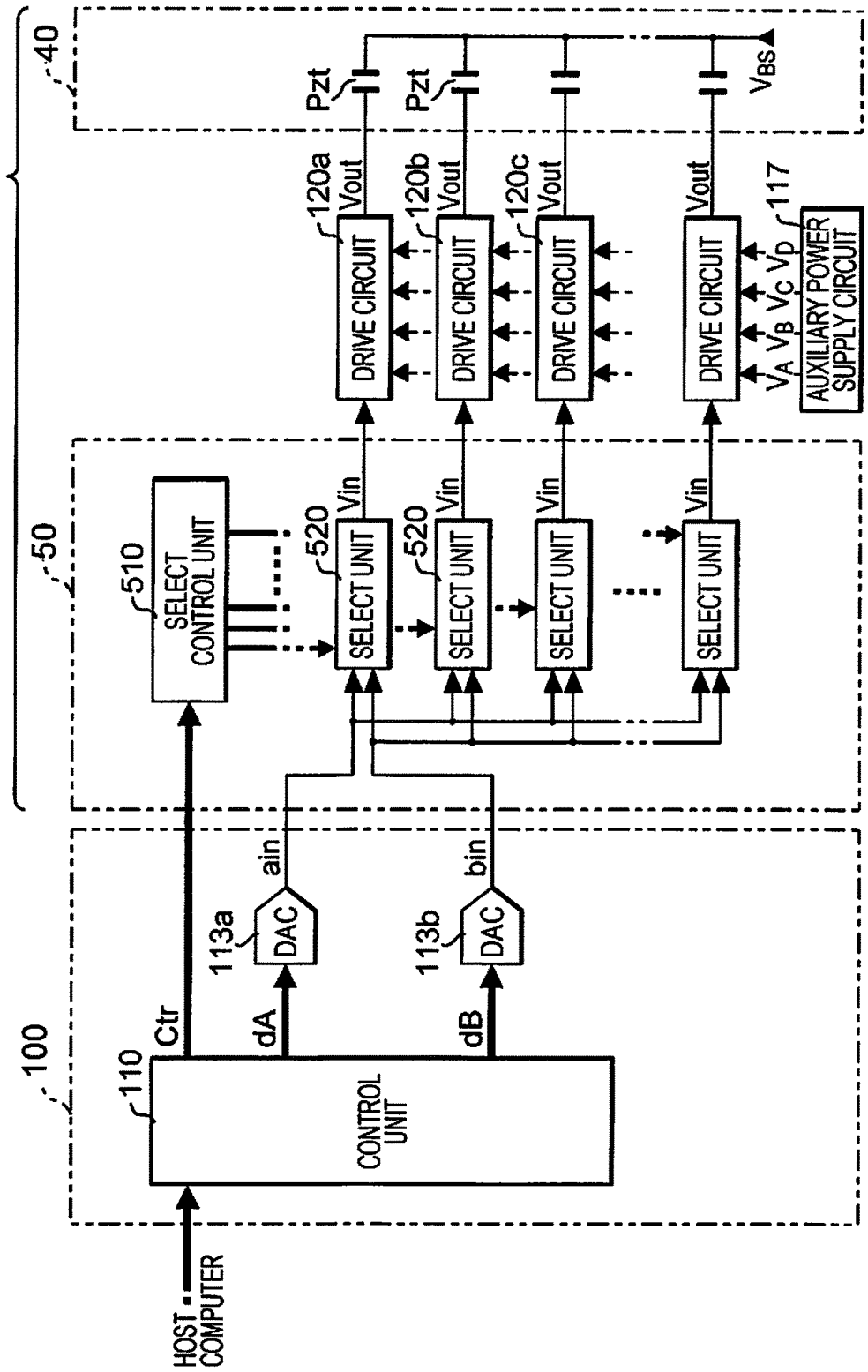
FIG. 20 is a diagram illustrating a configuration of the printing apparatus according to still another example (the second of those).
Figure 21:
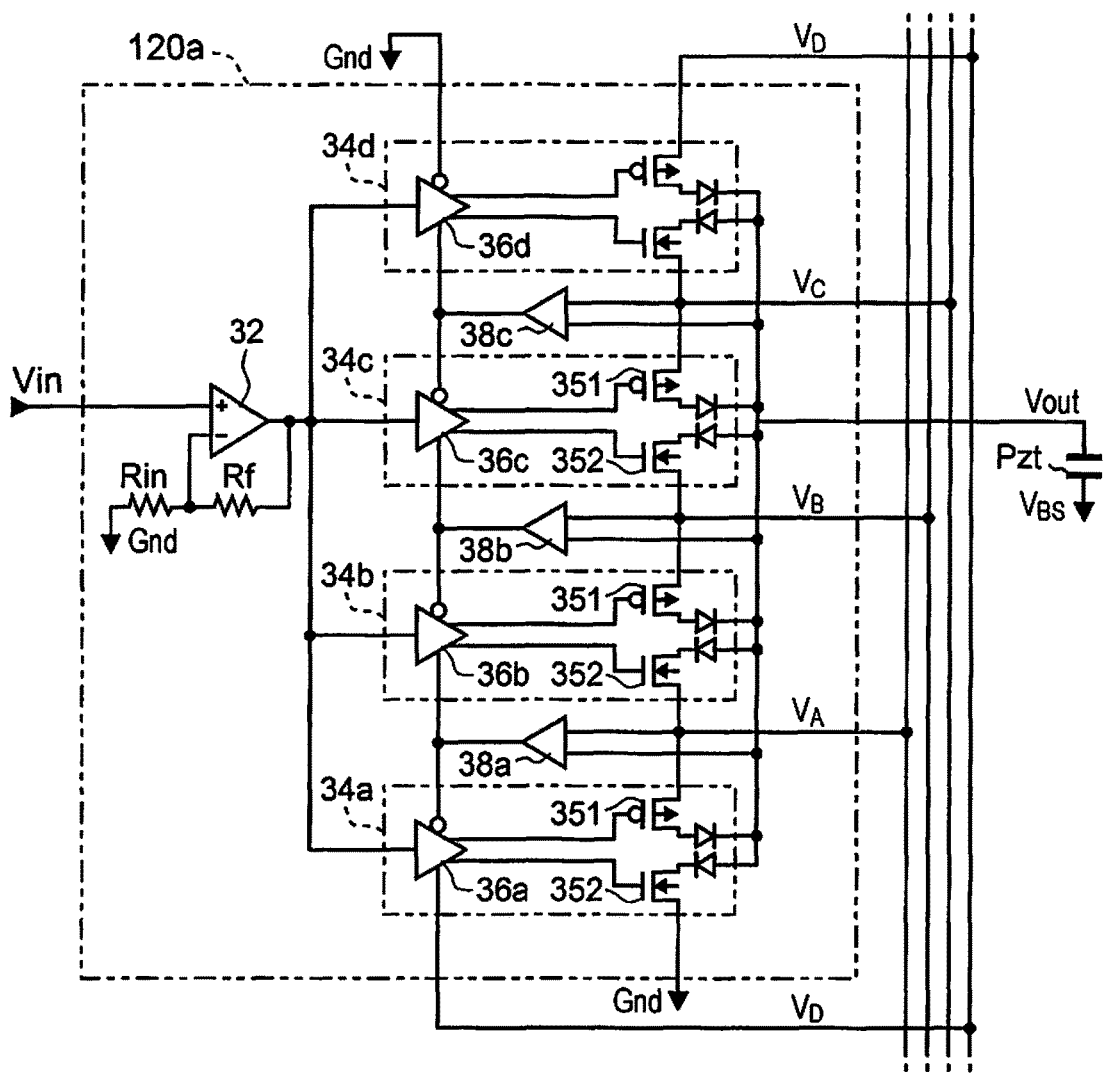
FIG. 21 is a diagram illustrating a configuration of the drive circuit of the printing apparatus according to still another example (the second of those).

FIG. 20 is a block diagram illustrating an electrical configuration of a printing apparatus according to another example (the second of those), and FIG. 21 is a diagram illustrating a configuration of a drive circuit of the printing apparatus according to another example (the second of those).

A difference between the printing apparatus illustrated in FIG. 20 and the printing apparatus illustrated in FIG. 4 is that outputs of the DACs 113a and 113b are supplied to the select unit 520 of the head unit 3 through the flexible flat cable 190 (omitted in FIG. 14), and an output of the select unit 520 is amplified by the drive circuit 120 corresponding to the piezoelectric element Pzt to be supplied to one terminal of the piezoelectric element Pzt.

Each of drive circuits 120a, 120b, 120c, . . . illustrated in FIG. 20 is configured to voltage-amplify the signal of the voltage Vin selected by the select unit 520 by using four types of the voltages $V_A$, $V_B$, $V_C$, and $V_D$ except for the ground Gnd of zero volts, to convert the signal into a low impedance, to drive the piezoelectric element Pzt as a drive signal of the voltage Vout, and to include an operational amplifier 32, unit circuits 34a to 34d, and comparators 38a to 38c. Among these, the unit circuit 34a includes a level shifter 36a, transistors 351 and 352 which are a pair of transistors, and a diode for preventing a reverse current. In the same manner, the unit circuit 34b (34c, 34d) includes a level shifter 36b (36c, 36d), the transistors 351 and 352, and the diode for preventing a reverse current.

In the drive circuit 120, for example, the operational amplifier 32, the level shifters 36a to 36d, and the comparators 38a to 38c are integrated as a semiconductor integrated circuit.

For this reasons, the drive circuit 120 according to another example can also apply the disposition illustrated in FIG. 16 to the leads which receive the voltages $V_A$, $V_B$, $V_C$, and $V_D$.

Detailed description on functions and operations of each unit in the drive circuit 120 are made in, for example, JP-A-2014-184569, thereby, being omitted.

According to the configurations illustrated in FIG. 20 and FIG. 21, resistance of a wire can be reduced by efficient disposition of an element in the main substrate 100, and the signals ain and bin with a small amplitude are supplied through the flexible flat cable 190, and thus, it is possible to reduce effects of a decrease or the like of print quality due to power loss or waveform distortion.

In the configuration illustrated in FIG. 20, the DACs 113a and 113b may be provided on a side of the head unit 3 in the same manner as the configuration illustrated in FIG. 19.

In the aforementioned description, the high side transistor of the pair of transistors is configured by a P-channel transistor and the low side transistor thereof is configured by an N-channel transistor, the high side transistor and the low side transistor may be any one of the P-channel transistor and the N-channel transistor.

In addition, in the aforementioned description, the drive circuit is configured to amplify a voltage by using four types of voltages $V_A$, $V_B$, $V_C$, and $V_D$ except for the ground Gnd and convert the signal into low impedance, but the voltages may be two or more types, and thus, for example, five or more types of voltages may be used, and three types of voltages may be used. In addition, an interval between the voltages do not necessarily have to be equal interval.

In the aforementioned description, the liquid ejecting apparatus is described as a printing apparatus, but the liquid ejecting apparatus may be a three-dimension shaping apparatus which ejects liquid to form a three-dimensional object, a textile printing apparatus which ejects liquid to print onto a textile, or the like.

Furthermore, in the above description, an example is described in which the piezoelectric element Pzt for ejecting ink is used as a drive target of the drive circuit, but when considering the drive circuit which is separated from the printing apparatus, the drive target is not limited to the piezoelectric element Pzt, and can be applied to all of a load with capacitive components, such as an ultrasonic motor, a touch panel, an electrostatic speaker, or a liquid crystal panel.

What is claimed is:

1. A liquid ejecting apparatus comprising:
    an ejecting unit that includes a piezoelectric element and ejects liquid by driving the piezoelectric element;
    a first drive circuit that generates a first drive signal from a first original drive signal which is an origin of the first drive signal driving the piezoelectric element in accordance with a first voltage and a second voltage higher than the first voltage;
    a second drive circuit that generates a second drive signal from a second original drive signal which is an origin of the second drive signal driving the piezoelectric element in accordance with the first voltage and the second voltage; and
    a circuit substrate having one surface on which the first drive circuit is mounted and the other surface on which the second drive circuit is mounted,
    wherein the first drive circuit includes,
        a first control circuit;
        a first pair of transistors to which the first voltage is applied; and
        a second pair of transistors which is electrically coupled in series to the first pair of transistors and to which the second voltage is applied,
    wherein the first control circuit outputs a first control signal for controlling an operation of the first pair of transistors and a second control signal for controlling an operation of the second pair of transistors, respectively, in accordance with the first original drive signal,
    wherein the second drive circuit includes,
        a second control circuit;
        a third pair of transistors to which the first voltage is applied; and
        a fourth pair of transistors which is electrically coupled in series to the first pair of transistors and to which the second voltage is applied,
    wherein the second control circuit outputs a third control signal for controlling an operation of the first pair of transistors and a fourth control signal for controlling an operation of the fourth pair of transistors, in accordance with the second original drive signal, and
    wherein the first pair of transistors, the second pair of transistors, the third pair of transistors, and the fourth pair of transistors are disposed on the circuit substrate such that a distance between the first pair of transistors and the third pair of transistors is shorter than a distance between the first pair of transistors and the fourth pair of transistors, and a distance between the second pair of transistors and the fourth pair of transistors is shorter than a distance between the second pair of transistors and the third pair of transistors.

2. The liquid ejecting apparatus according to claim 1, wherein the first control circuit is integrated into a first integrated circuit, and wherein the second control circuit is integrated into a second integrated circuit.

3. The liquid ejecting apparatus according to claim 2, wherein an electrical distance between the first integrated circuit and the first pair of transistors is equal to an electrical distance between the second integrated circuit and the third pair of transistors, and
wherein an electrical distance between the first integrated circuit and the second pair of transistors is equal to an electrical distance between the second integrated circuit and the fourth pair of transistors.

4. The liquid ejecting apparatus according to claim 1, wherein the ejecting unit, the circuit substrate, the first pair of transistors, the second pair of transistors, the third pair of transistors, and the fourth pair of transistors are mounted on a movable carriage.

5. A drive circuit comprising:
a first drive circuit that generates a first drive signal from a first original drive signal which is an origin of the first drive signal driving a load in accordance with a first voltage and a second voltage higher than the first voltage;
a second drive circuit that generates a second drive signal from a second original drive signal which is an origin of the second drive signal driving the load in accordance with the first voltage and the second voltage; and
a circuit substrate having one surface on which the first drive circuit is mounted and the other surface on which the second drive circuit is mounted,
wherein the first drive circuit includes,
  a first control circuit;
  a first pair of transistors to which the first voltage is applied; and
  a second pair of transistors which is electrically coupled in series to the first pair of transistors and to which the second voltage is applied,
wherein the first control circuit outputs a first control signal for controlling an operation of the first pair of transistors and a second control signal for controlling an operation of the second pair of transistors, respectively, in accordance with the first original drive signal,
wherein the second drive circuit includes,
  a second control circuit;
  a third pair of transistors to which the first voltage is applied; and
  a fourth pair of transistors which is electrically coupled in series to the first pair of transistors and to which the second voltage is applied,
wherein the second control circuit outputs a third control signal for controlling an operation of the first pair of transistors and a fourth control signal for controlling an operation of the fourth pair of transistors, in accordance with the second original drive signal, and
wherein the first pair of transistors, the second pair of transistors, the third pair of transistors, and the fourth pair of transistors are disposed on the circuit substrate such that a distance between the first pair of transistors and the third pair of transistors is shorter than a distance between the first pair of transistors and the fourth pair of transistors, and a distance between the second pair of transistors and the fourth pair of transistors is shorter than a distance between the second pair of transistors and the third pair of transistors.

* * * * *